US012595140B2

(12) United States Patent   (10) Patent No.:   US 12,595,140 B2

Morency et al.   (45) **Date of Patent:   \*Apr. 7, 2026**

(54) INTELLIGENT ROBOTIZED DEPALLETIZER

(71) Applicant: Symbotic Canada, ULC, Montreal (CA)

(72) Inventors: Sylvain Paul Morency, Laval (CA); Louis Philippe Beaudoin, Montreal (CA); Matt Brecher, Montreal (CA); Christian Simon, Laval (CA); Salah Mellal, Montreal (CA); Rene Alexander Vides Ramirez, Montreal (CA); Philippe Ambeault, Montreal (CA); Guillaume Lemelin, Montreal (CA); William Legare, Terrebonne (CA)

(73) Assignee: Symbotic Canada, ULC (CA)

( \* ) Notice: Subject to any disclaimer, the term of this patent is extended or adjusted under 35 U.S.C. 154(b) by 0 days.

This patent is subject to a terminal disclaimer.

(21) Appl. No.: 19/012,345

(22) Filed: Jan. 7, 2025

(65) Prior Publication Data

US 2025/0145396 A1      May 8, 2025

Related U.S. Application Data

(63) Continuation of application No. 18/047,918, filed on Oct. 19, 2022, now Pat. No. 12,187,553.

(Continued)

(51) Int. Cl.
| | |
|---|---|
| *B65G 59/00* | (2006.01) |
| *B65G 59/02* | (2006.01) |
| *B65G 59/12* | (2006.01) |

(52) U.S. Cl.
CPC ......... *B65G 59/005* (2013.01); *B65G 59/026* (2013.01); *B65G 59/12* (2013.01); *B65G 2203/0233* (2013.01); *B65G 2203/043* (2013.01)

(58) Field of Classification Search
CPC .... B65G 59/005; B65G 59/026; B65G 59/12; B65G 2203/0233; B65G 2203/043; B65G 61/00
See application file for complete search history.

(56) References Cited

U.S. PATENT DOCUMENTS

| | | | |
|---|---|---|---|
| 5,096,367 | A | 3/1992 | Winski |
| 6,707,014 | B1 | 3/2004 | Corey et al. |

(Continued)

FOREIGN PATENT DOCUMENTS

| | | |
|---|---|---|
| EP | 2062838 | 5/2009 |
| EP | 2530037 | 12/2012 |

(Continued)

OTHER PUBLICATIONS

International Search Report for application No. PCT/CA2022/051555 dated Jan. 5, 2023.

*Primary Examiner* — Lynn E Schwenning
(74) *Attorney, Agent, or Firm* — Perman & Green, LLP

(57) ABSTRACT

A layer destacking system for destacking layer from stacked layer pallet load, including layer seating platform configured to seat the destacked layer on layer seating platform, conveying surface with conveyance traverse direction traverses the seated destacked layer off layer seating platform, slip sheet detection sensor coupled to layer seating platform and arranged to sense slip sheet in contact with seated destacked layer on uppermost surface and bottom surface of seated destacked layer, slip sheet pickup removal mechanism extending over layer seating platform configured to engage, above layer seating platform, slip sheet contacting one (Continued)

uppermost surface and bottom surface of seated destacked layer controller communicably coupled to slip sheet detection sensor to receive signal from slip sheet detection sensor identifying presence of slip sheet, controller is operably connected to slip sheet pickup removal mechanism to actuate slip sheet pickup removal mechanism engaging slip sheet contacting one uppermost surface and bottom surface.

20 Claims, 30 Drawing Sheets

Related U.S. Application Data

(60) Provisional application No. 63/270,765, filed on Oct. 22, 2021.

(56) References Cited

U.S. PATENT DOCUMENTS

| | | | |
|---|---|---|---|
| 9,481,530 B2 | 11/2016 | Brandmuller et al. | |
| 10,138,078 B2 | 11/2018 | Martin | |
| 11,485,586 B2 | 11/2022 | Kollmuss et al. | |
| 12,187,553 B2 * | 1/2025 | Morency | B65G 59/005 |
| 2008/0193272 A1 | 8/2008 | Beller | |
| 2013/0017053 A1 | 1/2013 | Forget et al. | |
| 2021/0114826 A1 | 4/2021 | Simon et al. | |
| 2021/0237990 A1 | 8/2021 | Morency et al. | |

FOREIGN PATENT DOCUMENTS

| | | |
|---|---|---|
| JP | 0986649 | 3/1997 |
| JP | 20080296939 | 12/2008 |

* cited by examiner

277

SEAT PALLET LAYER ON LAYER PLACE CONVEYOR ⟋ 2000

SENSE SLIP SHEET ⟋ 2010

RECEIVE A SIGNAL FROM SLIP SHEET DETECTION SENSOR IDENTIFYING PRESENCE OF SLIP SHEET ⟋ 2020

REMOVE SLIP SHEET ⟋ 2030

INTELLIGENT ROBOTIZED DEPALLETIZER

CROSS-REFERENCE TO RELATED APPLICATIONS

This application is a continuation of non-provisional patent application Ser. No. 18/047,918, filed on Oct. 19, 2022, (now U.S. Pat. No. 12,187,553), and claims the benefit of U.S. provisional patent application No. 63/270,765 filed on Oct. 22, 2021, the disclosures of which is incorporated herein by reference in their entireties.

BACKGROUND

1. Field

The disclosed embodiment generally relates to depalletizing, and more particularly, to slip sheet detection and removal.

2. Brief Description of Related Developments

The retail distribution of products (whether for conventional "brick and mortar" stores, online stores, or mixed retail channels) demands improvements in storage, sortation, and transport efficiencies, particularly for distribution of what is known as mixed cases or heterogeneous cases (within a given transport) whether for store replenishment or individual orders. The application of intelligent/adaptive automation thereto has increasingly facilitated improvement in efficiency at many levels of distribution including storage, sortation and transport.

Distribution centers and warehouses typically receive their products such as cases, boxes, open trays, stretch wrapped trays, etc. on a structured pallet, e.g. orderly positioned without gaps between them. Generally slip sheets (thin pallet-sized sheets of material) are placed between the pallet layers of the pallet to generally improve stability of the pallet load compared to pallet load without slip sheets. Depalletizing systems are known in the art to remove the products from the pallet. In some instances the slip sheet is removed with the pallet layer while in other instances the slip sheet remains on the pallet after picking of the pallet layer.

BRIEF DESCRIPTION OF THE DRAWINGS

The foregoing aspects and other features of the disclosed embodiment are explained in the following description, taken in connection with the accompanying drawings, wherein.

DETAILED DESCRIPTION

Figure 1:
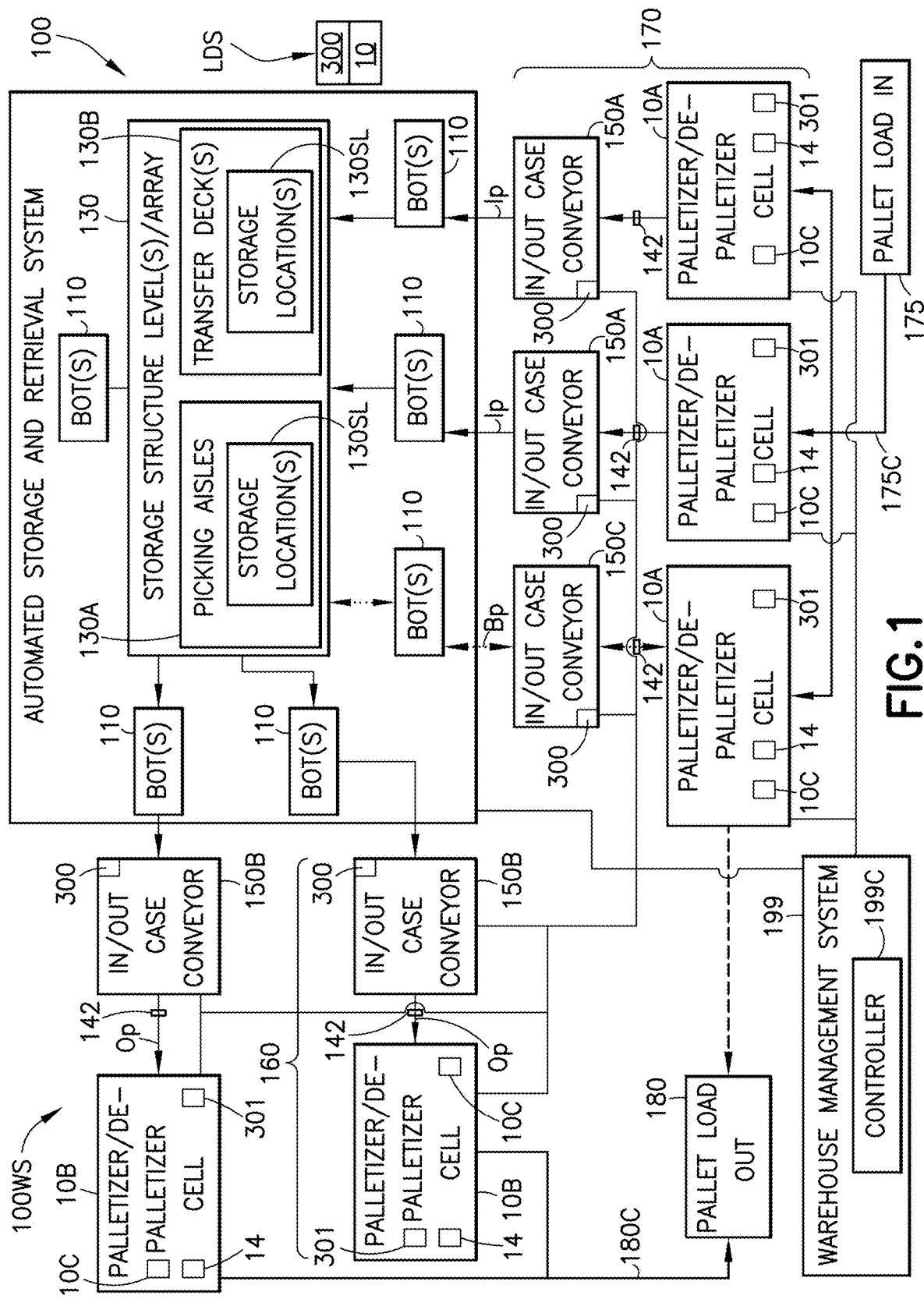
FIG. 1 is a schematic illustration of a warehouse system in accordance with aspects of the disclosed embodiment.

FIG. 1 is a schematic illustration of a warehouse system or distribution facility 100WS (referred to herein as warehouse system 100WS) in accordance with aspects of the disclosed embodiment. Although the aspects of the disclosed embodiment will be described with reference to the drawings, should be understood that the aspects of the disclosed embodiment can be embodied in many forms. In addition, any suitable size, shape or type of elements or materials could be used. It should be understood that while the warehouse system 100WS is described herein as an automated warehouse system the aspects of the disclosed embodiment are also applicable to distribution facilities having any suitable transport systems, such as both automated and manual transport systems or to wholly manual transport systems.

Figure 2:
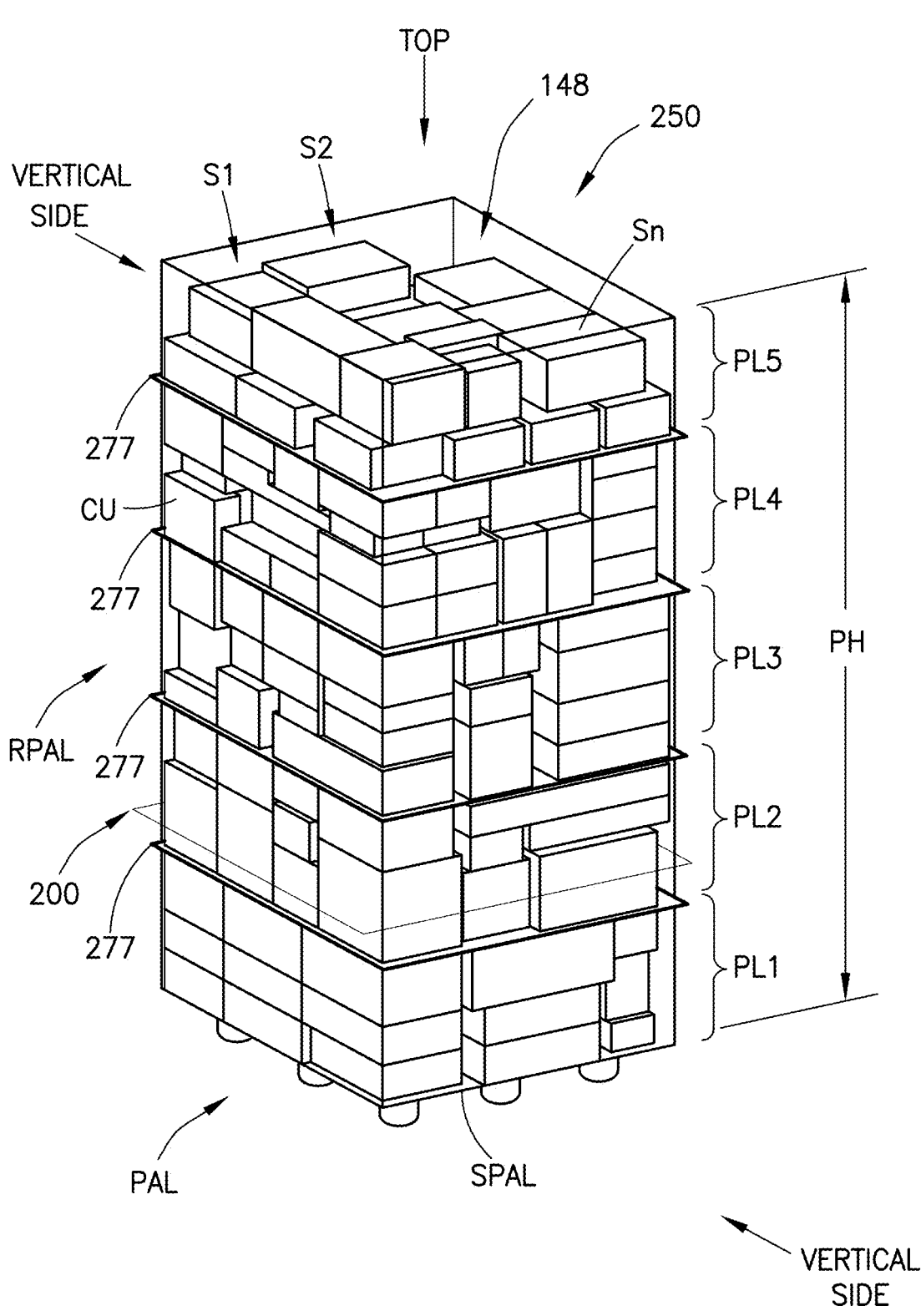
FIG. 2 is a schematic illustration of a pallet load in accordance with aspects of the disclosed embodiment.
Figure 3:
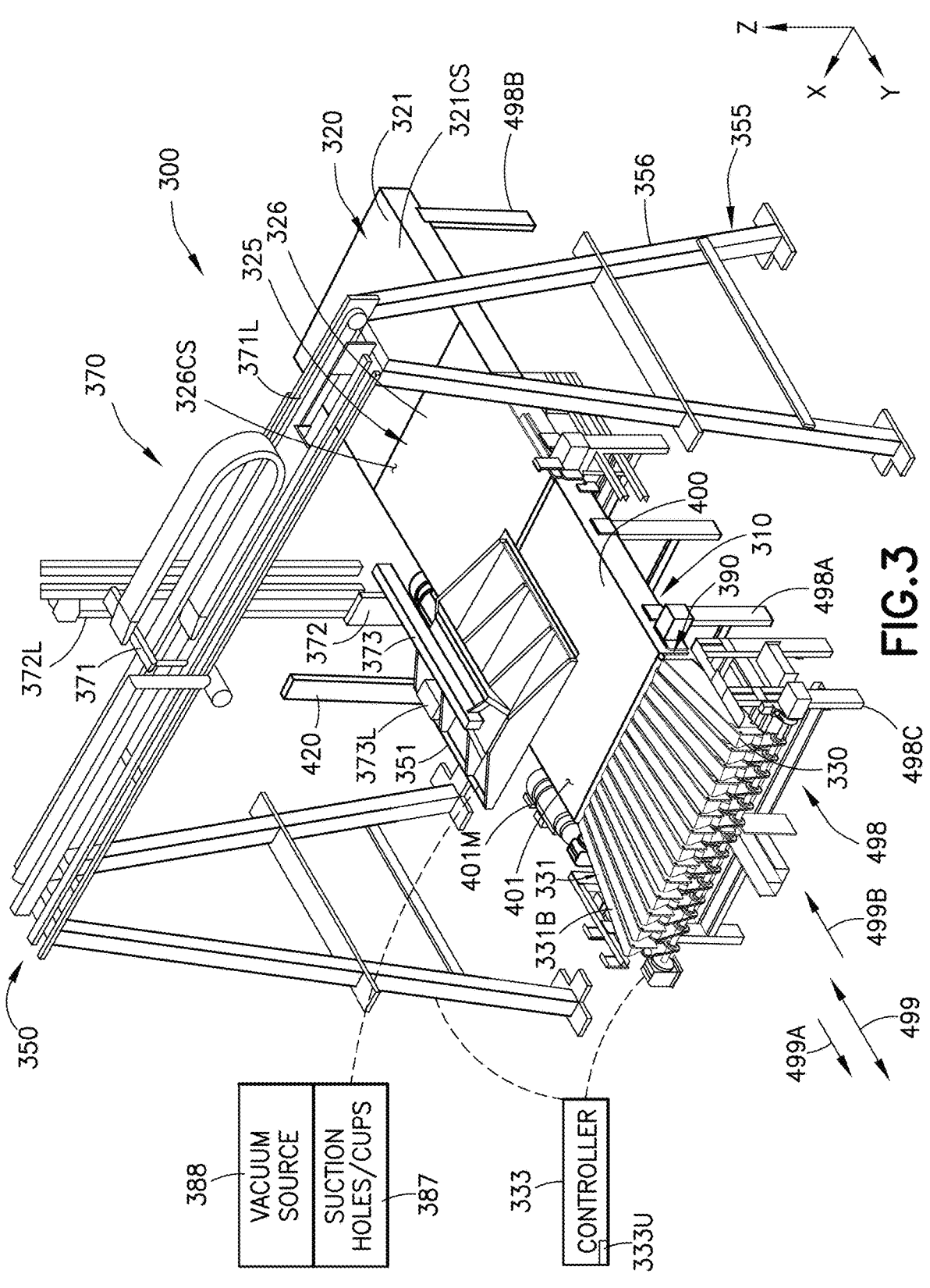
FIG. 3 is a schematic perspective illustration of a bottom slip sheet removal system of the warehouse system of FIG. 1 in accordance with aspects of the disclosed embodiment.

Referring to FIGS. 1, 2, and 3, the aspects of the disclosed embodiment provide an automatic inbound bottom slip sheet detection and removal system 300 (also referred to herein as the slip sheet removal system for convenience). The slip sheet removal system 300 is configured to receive a pallet layer from a palletizer cell 10 of the warehouse system 100WS. The slip sheet removal system 300 includes an intelligent detection system (as described herein) that is configured to at least detect a presence of a slip sheet 277 (see FIGS. 2, 16A, and 16B) located at least underneath (i.e., a bottom slip sheet) the pallet layer PL1-PL5 (each of pallet layer PL1-PL5 being generally referred to as pallet layer PL). Based on the detected presence of the slip sheet 277 the slip sheet removal system 300 is configured to move the pallet layer PL off of the slip sheet 277 and effect removal of the slip sheet 277 from the slip sheet removal system 300. Here, at least some of the components of the slip sheet removal system 300 that effect slip sheet removal are actuated upon detection of the presence of the slip sheet and are otherwise deactivated upon detection of the absence of a slip sheet such that feed of subsequent pallet layers along a conveyor of the slip sheet removal system is unencumbered by any removal of a detected slip sheet. In accordance with the aspects of the disclosed embodiment, the slip sheet removal system 300 may decrease operating costs and may increase service life of the slip sheet removal system 300 as the slip sheet removal components are actuated when a slip sheet is detected and are otherwise deactivated. The slip sheet removal system 300 may also provide compact footprint so that the slip sheet removal system 300 may be integrated with a conveyor system having commercially available conveyor sections. The slip sheet removal system 300 may also provide for slip sheet 277 removal with a substantially steady state/continuous conveyance of pallet layers/cases through the slip sheet removal system 300.

Referring to FIGS. 1 and 2, in accordance with the aspects of the disclosed embodiment, the warehouse system 100WS includes at least one palletizer/depalletizer cell 10A, 10B (generally referred to herein as palletizer cell 10). The palletizer cell 10 has one or more robotic case manipulator (s) 14 (also referred to herein as articulated robots, adaptive real time robots, robots, or product picking apparatus) that place (individually or manufactured pickfaces) mixed pallet load article units CU (also referred to herein as case units or cases or products 18) in stacks SL1-Sn and/or layers PL1-PL4 building a mixed case pallet load PAL with vision system assistance. A suitable example of a palletizer/depalletizer is described in U.S. Pat. No. 10,343,857 issued on Jul. 9, 2019 and titled "Vision-Assisted Robotized Depalletizer", and in U.S. patent application Ser. No. 17/070,753 filed on Oct. 14, 2020 and titled "Vision-assisted Robotized Depalletizer", the disclosures of which are incorporated herein by reference in their entireties.

Referring again to FIG. 1, in accordance with aspects of the disclosed embodiment the warehouse system 100WS includes a storage and retrieval system 100 that may operate in a retail distribution center or warehouse to, for example, fulfill orders received from retail stores for case units. In one example, the case units may be cases of units of goods not stored in trays, on totes or on pallets (e.g., uncontained). In other examples, the case units may be cases or units of goods that are contained in any suitable manner such as in trays, on totes or on pallets. It is noted that the case units may include cased units of goods (e.g., case of soup cans, boxes of cereal, etc.) or individual goods that are adapted to be taken off of or placed on a pallet. In accordance with the embodiments, shipping cases for case units (e.g. cartons, barrels, boxes, crates, jugs, or any other suitable device for holding case units) may have variable sizes and may be used to hold case units in shipping and may be configured so they are capable of being palletized for shipping. It is noted that when, for example, bundles or pallets of case units arrive at the storage and retrieval system the content of each pallet may be uniform (e.g., each pallet holds a predetermined number of the same item-one pallet holds soup and another pallet holds cereal) and as pallets leave the storage and retrieval system the pallets may contain any suitable number and combination of different case units (e.g., each pallet may hold different types of case units-a pallet holds a combination of soup and cereal). In the embodiments the storage and retrieval system described herein may be applied to any environment in which case units are stored and retrieved.

The storage and retrieval system 100 may be configured for installation in, for example, existing warehouse structures or adapted to new warehouse structures. In the aspects of the disclosed embodiment, the storage and retrieval system may include one or more in-feed transfer station 170 and one or more out-feed transfer station 160, in/out case conveyors 150A, 150B, 150C (generally referred to as in/out case conveyors 150), a storage structure array 130, and a number of autonomous vehicular transport robots 110 (referred to herein as "bots"). In the aspects of the disclosed embodiment the storage and retrieval system may also include robot or bot transfer stations, as described in U.S. Pat. No. 9,096,375 issued on Aug. 4, 2015 the disclosure of which is incorporated by reference herein in its entirety. In the aspects of the disclosed embodiment the bot transfer stations may provide an interface between the bots 110 and the in/out case conveyors 150 such that case units can be indirectly transferred between the bots 110 and the in/out case conveyors 150 through the bot transfer stations. In the aspects of the disclosed embodiment case units may be transferred directly between the bots 110 and the in/out case conveyors 150.

The storage structure array 130 may include multiple levels of storage rack modules that form a storage array of storage locations 130SL for case units, each storage location 130SL of which is arranged for storage of at least one case unit at each storage location 130SL. In one aspect, each level of the storage structure array 130 includes respective storage/picking aisles 130A, and transfer decks 130B for transferring case units between any of the storage areas of the storage structure array 130 and any shelf of any in/out case conveyors 150. The storage aisles 130A, and transfer decks 130B are also configured to allow the bots 110 to traverse the storage aisles 130A and transfer decks 130B for placing case units into picking stock and to retrieve ordered case units, where the case units are stored or otherwise held in the storage aisles 130A and/or on the transfer deck 130B in storage locations 130SL. The bots 110 may be any suitable bots capable of carrying and transferring case units throughout the storage and retrieval system 100. Suitable examples of bots can be found in, for exemplary purposes only, U.S. Pat. No. 8,425,173 issued on Apr. 23, 2013, U.S. Pat. No. 9,561,905 issued on Feb. 7, 2017, U.S. Pat. No. 8,965,619 issued on Feb. 24, 2015, U.S. Pat. No. 8,696,010 issued on Apr. 15, 2014, U.S. Pat. No. 9,187,244 issued on Nov. 17, 2015, United States pre-grant publication number 2012/0189416 (U.S. Ser. No. 13/326,952) titled "Automated Bot with Transfer Arm" filed on Dec. 15, 2011, and U.S. Pat. No. 9,499,338 issued on Nov. 22, 2016, the disclosures of which are incorporated by reference herein in their entireties. The bots 110 may be configured to place case units, such as the above described retail merchandise, into picking stock in the one or more levels of the storage structure array 130 and then selectively retrieve ordered case units for shipping the ordered case units to, for example, a store or other suitable location.

The in-feed transfer stations 170 and out-feed transfer stations 160 may operate together with their respective in/out case conveyors 150A, 150B for bi-directionally transferring case units to and from one or more levels of the storage structure array 130 effecting infeed of the case units into the storage structure array 130 and output of the case units from the storage structure array 130. It is noted that while the in-feed transfer stations 170 and the outfeed transfer stations 160 (and their respective in/out case conveyors 150A, 150B and palletizer/depalletizer cells 10A, 10B) are described as being dedicated inbound (e.g., in-feed) transfer stations 170 and dedicated outbound (e.g., out-feed) transfer stations 160, in the aspects of the disclosed embodiment each of the transfer stations 170, 160 may be used for both inbound and outbound transfer of case units from the storage and retrieval system. It is noted that while in/out case conveyors are described herein, the conveyors may be any suitable conveyors (including any suitable transport path orientation, such as vertical and/or horizontal conveyor paths) or transfer/picking devices having any suitable transport path orientation.

In one aspect, as described above, each of the in-feed transfer stations 170 and the out-feed transfer stations 160 include a respective in/out case conveyor 150A, 150B (at least one of which includes the slip sheet removal system 300) and a respective palletizer/depalletizer cell 10A, 10B (referred to generally herein as palletizer cell 10). In one aspect, the palletizer/depalletizer cells 10 are automated cells each being configured to receive loaded pallets (such as with uniform or mixed case units or products) from, for example, a pallet load in area 175 which may include an in-out loaded pallet conveyor 175C (illustrated in FIG. 1 as an input conveyor) and/or build a loaded pallet (such as with uniform or mixed case units or products) for transport to, for example, a pallet load out area 180 which may include an in-out loaded pallet conveyor 180C (illustrated in FIG. 1 as an output conveyor). In one aspect, the conveyors 175C, 180C are each connected to the storage structure array 130 and are configured so as to bi-directionally transport loaded pallets in an input direction towards the storage structure array 130, and in a different output direction away from the storage structure array 130. In one aspect, the conveyors 175C, 180C may each include a conveyor arrangement with a distributed conveyor bed arranged to form a conveying path or in other aspects, the conveyors 175C, 180C may be discrete transport units such as, for example, a fork lift/pallet truck. Suitable examples of automated palletizer/depalletizer cells 10A, 10B may be found in U.S. patent application Ser. No. 15/235,254 filed on Aug. 12, 2016, and U.S. Pat. No. 8,965,559 issued on Feb. 24, 2015, the disclosures of which are incorporated herein by reference in their entireties. Each palletizer cell includes one or more robotic case manipulators 14, which may also be referred to articulated robots or robots. The one or more robotic case manipulators 14 are configured, as described herein, so as to transport and place the pallet load article units CU serially onto a pallet support so as to build (or in other aspects as described herein, decompose or decommission) the pallet load 250 on a pallet unloading/loading station 301 (see FIG. 3).

Where the palletizer cell 10 functions in an output role as a palletizer, pallet load article units CU, that can be of various sizes, arrive at the palletizer cell 10 via the in/out case conveyors 150B, are picked by one of the robotic case manipulators 14 and placed on the pallet load PAL as will be described herein. Where the palletizer cell 10 functions in an output role as a palletizer, a full pallet load PAL (see FIG. 2) made from a variety of case units is ready to be picked up by a forklift from the palletizer cell 10 for conveyance to a pallet load out 180 area. Where the palletizer/depalletizer cell 10 functions in an input role as a depalletizer, a full pallet load of cases (which may be similar to pallet load PAL and formed of homogenous or mixed cases), made from a variety of pallet load article units CU, disposed in pallet load layers, is transferred to a pallet unloading/loading station 301 of the palletizer cell 10 in any suitable manner, such as by a fork lift or other conveyance, from a pallet load in 175 area. Each of the pallet load layers PL1, PL2, PL3, PL4, PL5 being formed of more than one cases CU juxtaposed at a common level over an area of the pallet load PAL. In one aspect, as illustrated in FIG. 2, the pallet layers may be mixed pallet layers that include cases CU of different sizes; while in other aspects, as illustrated in FIG. 3, the pallet layers may be uniform layers that include cases CU having substantially the same size throughout the pallet layer. The one or more robotic case manipulators 14 pick the pallet load article units CU from the pallet PAL for transfer into the storage structure array 130.

In one aspect, each in-feed transfer station 170 forms, a case input path Ip where the palletizer/depalletizer cell 10A depalletizes case units, layer by layer, or otherwise depalletizes the case units into single case units from standard pallets (e.g., homogenous pallets having a stability suitable for automatic engagement of a pallet layer by an automatic layer interface unit, such as the product picking apparatus or robot 14). The palletizer/depalletizer cell 10A is in communication with a transport system of the automated storage and retrieval system 100, such as an in/out case conveyor 150A so as to form an integral input system (e.g., the in-feed transfer station 170) that feeds case units to the automated storage and retrieval system 100. Each in-feed transfer station 170 defines the case input path Ip that is integrated with the automated storage and retrieval system 100 and warehouse management system 199, where the warehouse management system 199 includes any suitable controller 199C configured with any suitable non-transitory program code and memory to manage, at least, case unit input to the storage structure array 130, case unit storage distribution within the storage structure array 130 and case unit retrieval from the storage structure array 130, case unit inventory/replenishment, and case unit output.

In one aspect, each case unit input path Ip includes at least one corresponding case unit inspection cell 142 in communication with the warehouse management system 199. In one aspect, the at least one corresponding case unit inspection cell 142 may be any suitable inspection cell including any suitable volumetric inspection, such as with a multidimensional light curtain, imaging systems and/or any other suitable sensing/sensor arrangement configured to detect case unit defects and identify the case units for, e.g., inventory, transport sequencing, storage distribution and sequencing the case unit for output from the storage structure array 130.

In one aspect, as noted above, the palletizer/depalletizer cell 10A may be fully automatic so as to break down or decommission layer(s) from a pallet unloading at the palletizer/depalletizer cell 10A. It is noted that, referring to FIG. 2, the term decommission refers to the removal of a pallet layer PL1, PL2, PL3, PL4 (in whole or in part) from a pallet PAL so that each pallet load article unit CU is removed from the layer PL1, PL2, PL3, PL4 at a predetermined level 200 (which may correspond to a decommissioning/commissioning level or transfer plane) of the pallet PAL so that, in some aspects, the pallet PAL is indexed (by any suitable pallet lifting device of the palletizer cell 10) to a next level of the pallet PAL for removal of the next layer PL2, PL3 (in whole or in part) corresponding to the next level of the pallet PAL.

In one aspect, the palletizer/depalletizer cell 10A is configured to decommission the layers PL1, PL2, PL3, PL4 so that the decommissioning is synchronous or otherwise harmonized by (e.g., matched with) the warehouse management system 199 with a predetermined rate of case unit flow or feed rate, established by the warehouse management system 199, in the automated storage and retrieval system 100. For example, in one aspect, the warehouse management system 199 is configured to set and/or monitor a predetermined rate of case unit flow within the automated storage and retrieval system 100. For example, the warehouse management system 199 monitors and manages the automated systems of the automated storage and retrieval system 100 (such as, e.g., the in/out case conveyors 150A, 150B, bots 110 and palletizer/depalletizer cells 10A, 10B), where each of the automated systems, or one or more of automated systems have a given transaction time (such as a time/period to effect a basic unit of transport or transfer of cases, e.g. to transfer a case unit on/off the in/out case conveyor to a pick/place station, or lift a case unit a predetermined distance, or bot transfer pick/place on a storage location, a time to transfer a pallet layer to or from a pallet, etc.) that in effect, singularly or in combination define, under control of the warehouse management system 199 or any other suitable controller of the automated storage and retrieval system 100 (e.g., bot controllers, conveyor controllers, palletizer/depalletizer controllers, etc.), the predetermined rate of case unit flow in the automated storage and retrieval system 100 established by the warehouse management system 199. For example, the controller 199C of the warehouse management system 199 is communicably connected to the in-out case conveyor(s) 150A, 150B so that the in-out case conveyor(s) 150A, 150B bi-directionally transport the case units to and from the storage structure array 130 at a predetermined case feed rate. The controller 199C may also be communicably connected to a palletizer-depalletizer cell 10A, 10B corresponding to the in-out case conveyor(s) 150A, 150B so that the layer commissioning and decommissioning of the palletizer/depalletizer cell 10A, 10B, which are respectively substantially continuous, matches the predetermined case feed rate. While the aspects of the disclosed embodiment are described herein with respect to a warehouse system 100WS having automated storage and retrieval system 100 with automated transport systems, the aspects of the disclosed embodiment are also applicable to distribution facilities having any suitable transport systems such as both automated and manual transport systems or to wholly manual transport systems, where both the automated transport transactions and the manual transport transactions each have respective transaction times where the commissioning and decommissioning of case units to and from pallets may be matched to the transaction times in a manner substantially similar to that described herein.

In one aspect, each out-feed transfer station 160 forms, a case output path Op where the palletizer/depalletizer cell 10B palletizes case units, layer by layer onto pallets PAL such as with an automatic layer interface unit, such as the one or more robotic case manipulators 14. In one aspect, the pallets PAL may be formed as standard pallets (e.g. homogeneous case units) or as mixed pallets, such as described in U.S. patent application Ser. No. 14/997,920 filed on Jan. 18, 2016 the disclosure of which is incorporated herein by reference in its entirety. In one aspect, the warehouse management system 199 is configured to establish a pallet solution, with mixed case units, that provides a stable pallet load stack suitable for an end effector of the one or more robotic case manipulators 14 to transfer as a layer. As described above, a suitable example, of the palletizer/depalletizer cell 10B may be found in U.S. patent application Ser. No. 15/235,254 filed on Aug. 12, 2016, the disclosure or which was previously incorporated herein by reference in its entirety.

In one aspect, the palletizer/depalletizer cell 10B is in communication with a transport system of the automated storage and retrieval system 100, such as an in/out case conveyor 150B so as to form an integral output system (e.g., the out-feed transfer station 160) that receives case units from the automated storage and retrieval system 100 for placement on pallets according to any suitable case out order sequence. For example, as described above, pallet load article units or cases CU routed to the one or more robotic case manipulators 14 are transferred to the pallet PAL by the end effector of the one or more robotic case manipulators 14, with the pallet load article units CU (output case units) being arranged in a predetermined sequence established by the warehouse management system 199, layer by layer (noting that the layer may cover the pallet in whole or in part) to form a standard output pallet load.

Each out-feed transfer station 160 defines the case output path Op that is integrated with the automated storage and retrieval system 100 and warehouse management system 199, where the warehouse management system 199 includes any suitable controller 199C configured with any suitable non-transitory program code and memory to manage the operation of the warehouse system 100WS, including case unit output from the storage structure array 130, as described herein. In one aspect, each case unit output path Op includes at least one corresponding case unit inspection cell 142 (as described above) in communication with the warehouse management system 199. In one aspect, as noted above, the palletizer/depalletizer cell 10B may be fully automatic so as to build or commission layer(s) to a pallet loading at the palletizer/depalletizer cell 10B. It is noted that, referring to FIG. 2, the term commission refers to the construction of a pallet layer PL1, PL2, PL3, PL4 (in whole or in part) to a pallet PAL so that each pallet load article unit CU is inserted to the layer PL1, PL2, PL3, PL4 at a predetermined level 200

(which may correspond to a decommissioning/commissioning level or transfer plane) of the pallet PAL until the pallet layer PL1, PL2, PL3, PL4, PL5 is formed so that, in some aspect, the pallet PAL is indexed (by any suitable pallet lifting device of the palletizer cell 10) to a next level of the pallet PAL for building of the next layer PL1, PL2 (in whole or in part) corresponding to the next level of the pallet PAL. In one aspect, the palletizer/depalletizer cell 10B is configured to commission the layers PL1, PL2, PL3, PL4, PL5 so that the commissioning is synchronous or otherwise harmonized (e.g. matched with) by the warehouse management system 199 with a predetermined rate of case unit flow or feed rate, established by the warehouse management system 199, in the automated storage and retrieval system 100 in a manner substantially similar to that described above with respect to the decommissioning of the layers PL1, PL2, PL3, PL4 where the warehouse management system 199 manages case unit retrieval order and the sequence of mixed case unit output to loadout sequence of the mixed case unit pallet load, and other associated aspects of output such as inventory reconciliation.

In accordance with aspects of the disclosed embodiment, and referring to FIGS. 1 and 3, the slip sheet removal system 300 forms a part of a respective in/out case conveyor 150 and includes a controller 333, at least a bottom slip sheet remover 310, and an intelligent detection system (as described herein). The slip sheet removal system 300 may also include one or more of a layer place conveyor 320 (also referred to as a layer seating platform), an accumulation conveyor 325 (of which the bottom slip sheet remover 310 is a part), a spreader conveyor 330, and a slip sheet remover 350. Here, the palletizer/depalletizer 10 and the slip sheet removal system 300 may be referred to as an intelligent robotized depalletizer or layer destacking system LDS (see FIG. 1 noting the layer destacking system LDS is schematically illustrated and where one or more in-feed transfer stations 170 include the layer destacking system LDS as illustrated. As described herein, the slip sheet removal system 300 provides intelligence to discriminate picking (and removing) a top slip sheet and a bottom slip sheet. The controller 333 is communicably coupled to the accumulation conveyor 325 (and the bottom slip sheet remover 310 thereof), the layer place conveyor 320, the spreader conveyor 330, and the slip sheet remover 350 (e.g., the controller 333 is connected to the respective components, e.g., motors, sensors, scanners, vision systems, etc. of the slip sheet removal system 300) to effect operation of the slip sheet removal system 300 in the manner described herein.

Figure 15A:
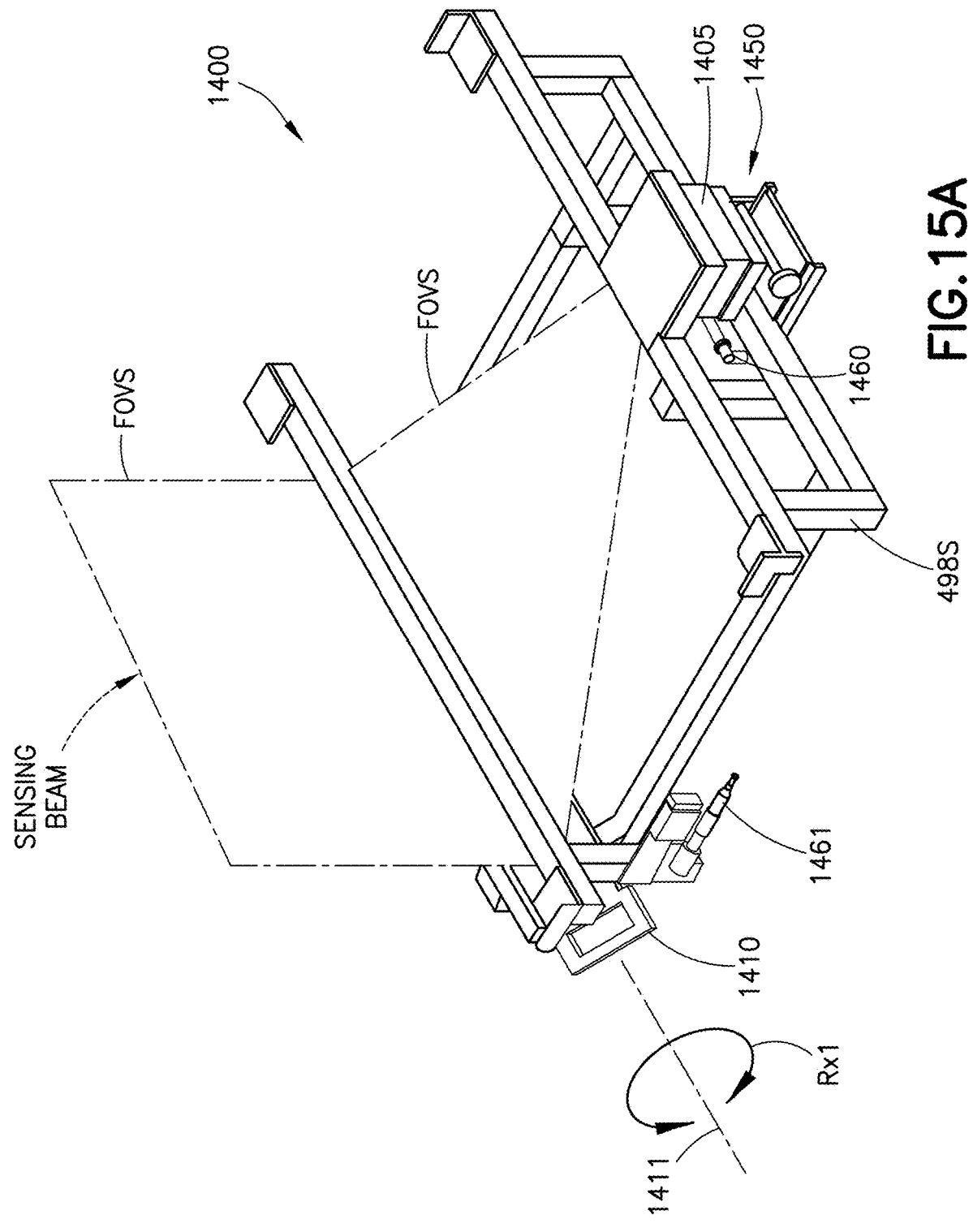
FIG. 15A is a schematic perspective illustration of a portion of the bottom slip sheet removal system of FIG. 3 in accordance with aspects of the disclosed embodiment.
Figure 15B:
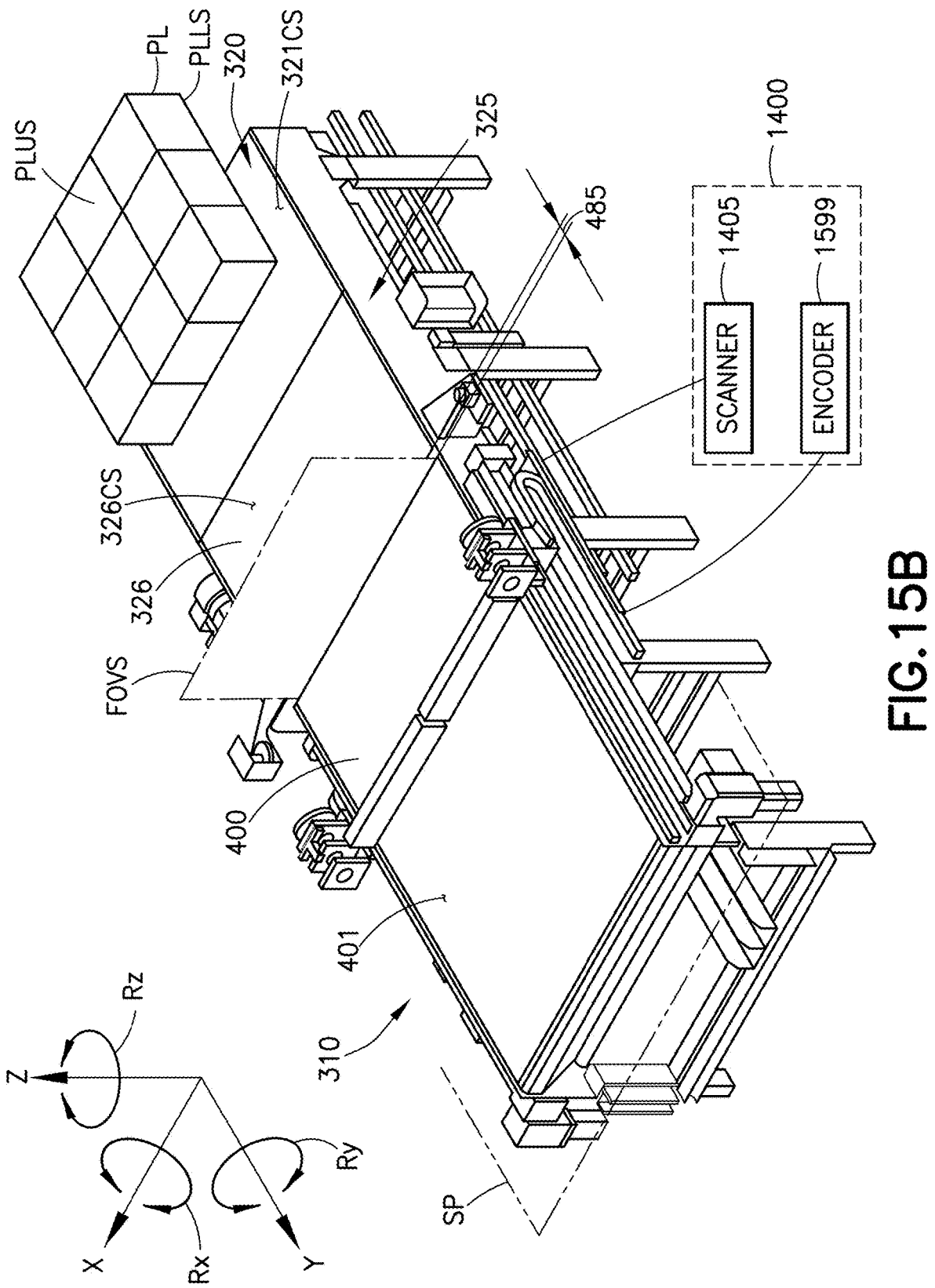
FIG. 15B is a schematic perspective illustration of a portion of the bottom slip sheet removal system of FIG. 3 in accordance with aspects of the disclosed embodiment.

As described herein, the slip sheet removal system 300 includes a slip sheet detection sensor (formed by one or more of the sensors, scanners, vision systems, etc. thereof) and the controller 333 is communicably coupled to the slip sheet detection sensor so as to receive a signal from the slip sheet detection sensor identifying presence of a slip sheet 277 (as described herein). The controller 333 is configured to determine from the received signal the slip sheet 277 contacting at least one of an uppermost surface PLUS and a bottom surface PLLS (see, e.g., FIG. 15B) of the seated pallet layer PL. The controller 333 is any suitable controller (with any suitable memory and processor) and in some aspects may be incorporated into the controller 199C or is otherwise in communication with at least controller 199C and/or a controller 10C of a corresponding palletizer/depalletizer cell 10A, 10B that conveys cases CU to or receives cases CU from the slip sheet removal system 300.

Referring to FIGS. 1, 3, 4A, 4B, 6, and 7, the accumulation conveyor 325 and layer place conveyor 320 are illustrated as having a common frame 498B; however, in other aspects the accumulation conveyor 325 and layer place conveyor 320 may have separate frames that are coupled to each other in any suitable manner to form frame 498B. The frame 498B is a portion of a frame 498 of the slip sheet removal system 300. The layer place conveyor 320 is configured to receive pallet layers PL from any suitable robotic case manipulator(s) 14 of the respective palletizer cell 10. The layer place conveyor 320 includes a mat top conveyor belt 321 having a conveying surface 321CS. Here, the layer place conveyor 320 is configured so as to seat the placed pallet layer PL (also referred to as a destacked layer) on the conveyance surface 321CS of the mat top conveyor belt 321. The mat top conveyor belt 321 has a conveyance traverse direction (e.g., direction 499) that traverses the seated pallet layer PL off of the layer place conveyor 320 (see FIGS. 3 and 16A-17B). For example, the mat top conveyor belt 321 is driven by any suitable motors to convey the placed pallet layer PL (i.e., seated on the mat top conveyor belt 321) in the conveyance direction 499A for transferring the pallet layer PL (and the cases CU thereof) to the accumulation conveyor 325 (see FIGS. 16A-17B). The accumulation conveyor 325 includes a mat top conveyor belt 326 having a conveying surface 326CS, where the mat top conveyor belt is driven by any suitable motors to convey the seated pallet layer PL (i.e., seated on the conveying surface 326CS) in the conveyance direction 499 for transferring the seated pallet layer PL (and the cases CU thereof) to the bottom slip sheet remover 310. The mat top conveyor belt 321 of the layer place conveyor 320 is driven at a lower speed than the mat top conveyor of the 326 of the accumulation conveyor 325 so that, without the presence of a slip sheet 277 underneath the seated pallet layer PL, the cases CU of the seated pallet layer are spaced apart from each other by a distance 1700 (see FIG. 17) in/along the conveyance direction 499 with transition of adjacent cases from the layer place conveyor 320 to the accumulation conveyor 325.

Figure 4A:
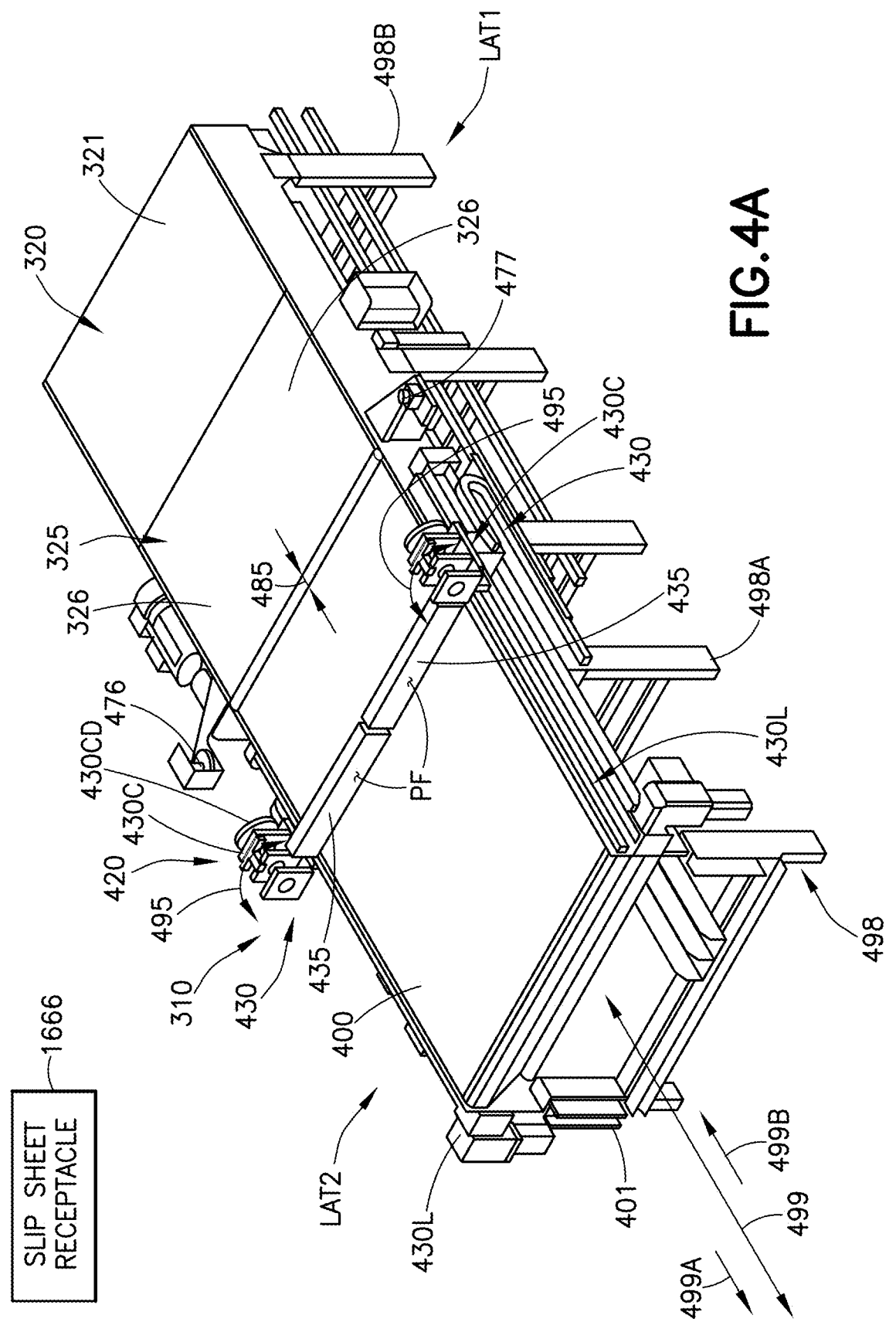
FIG. 4A is a schematic perspective illustration of a portion of the bottom slip sheet removal system of FIG. 3 in accordance with aspects of the disclosed embodiment.
Figure 4B:
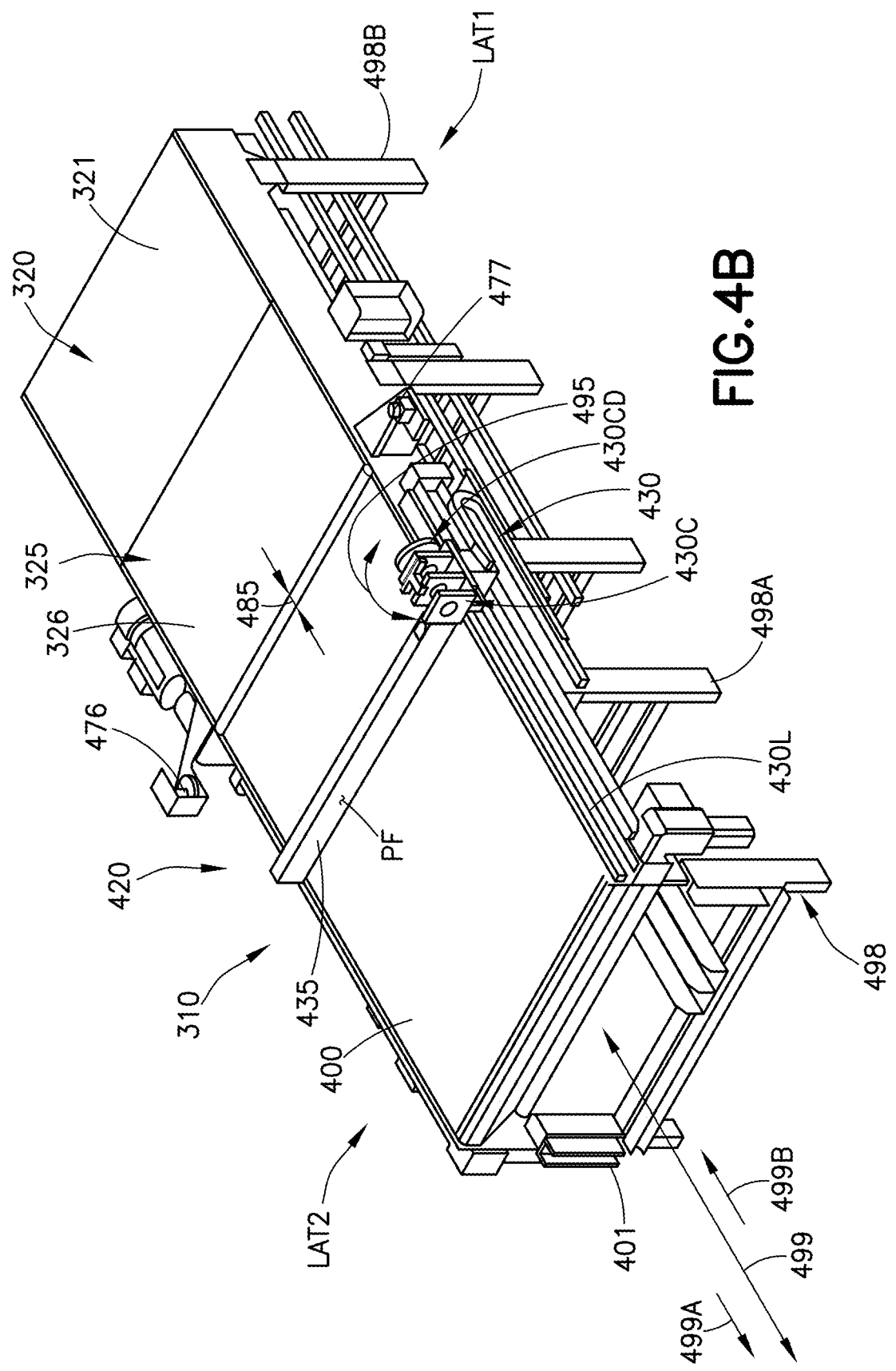
FIG. 4B is a schematic perspective illustration of a portion of the bottom slip sheet removal system of FIG. 3 in accordance with aspects of the disclosed embodiment.
Figure 5A:
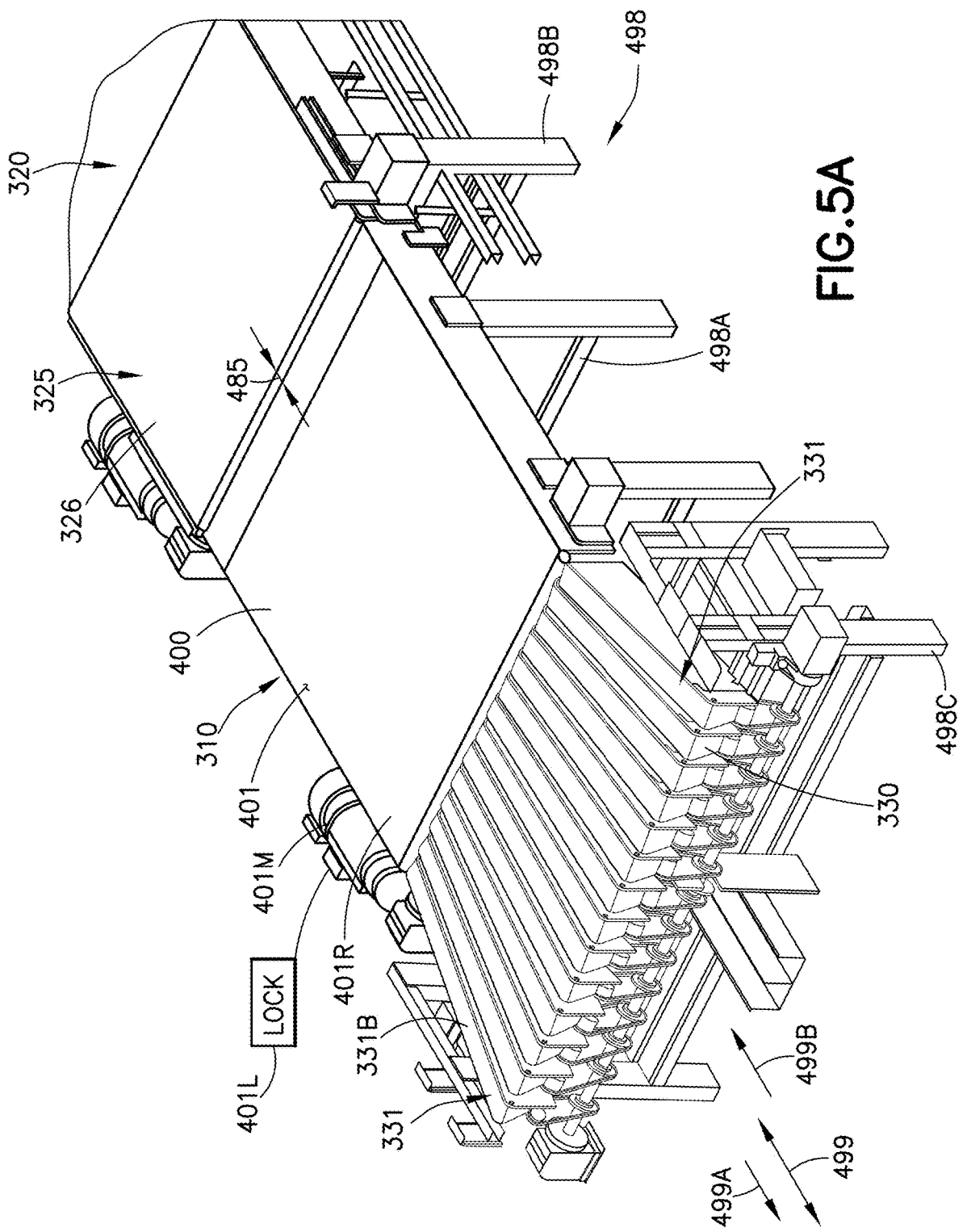
FIG. 5A is a schematic perspective illustration of a portion of the bottom slip sheet removal system of FIG. 3 in accordance with aspects of the disclosed embodiment.
Figure 5B:
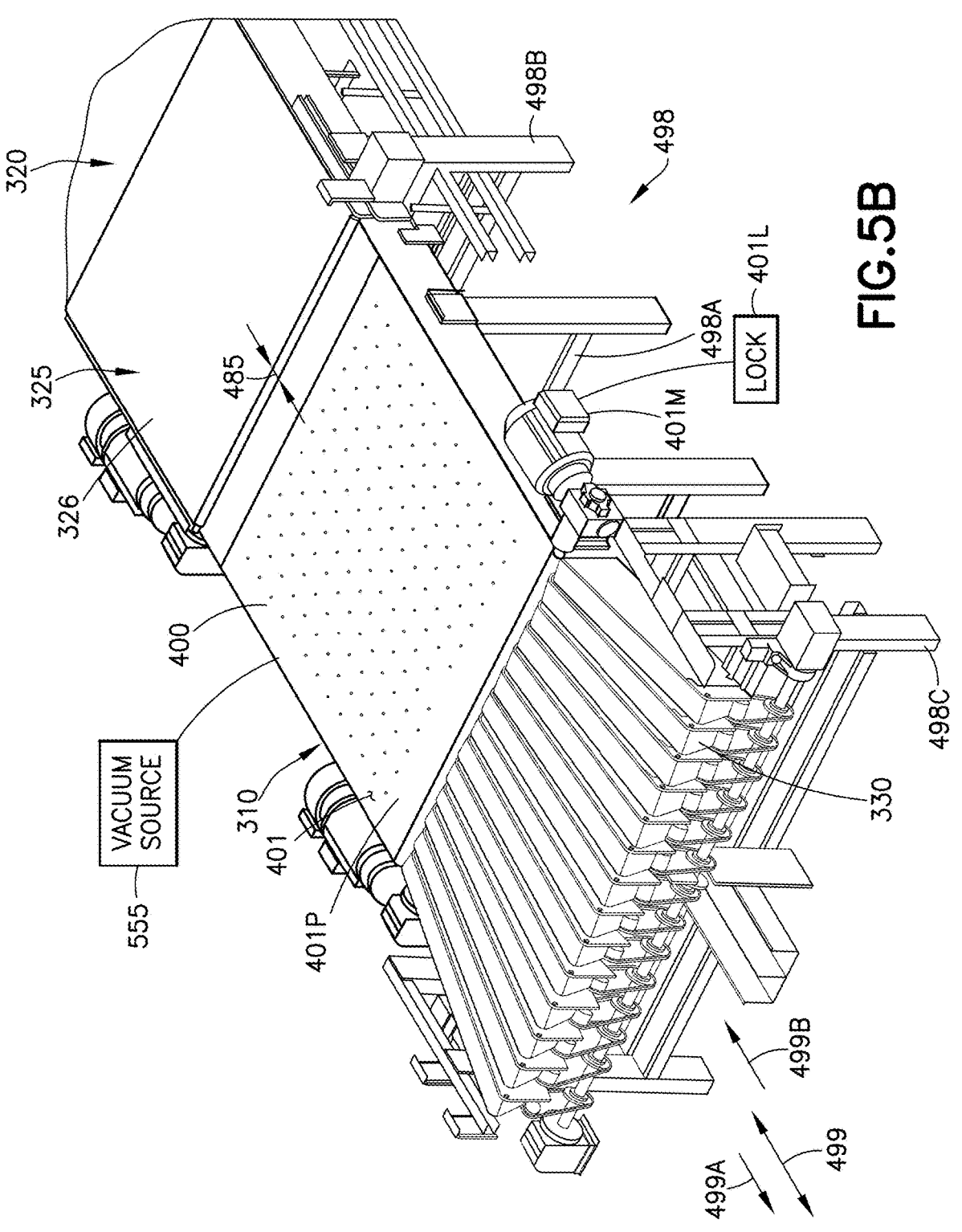
FIG. 5B is a schematic perspective illustration of a portion of the bottom slip sheet removal system of FIG. 3 in accordance with aspects of the disclosed embodiment.
Figure 5C:
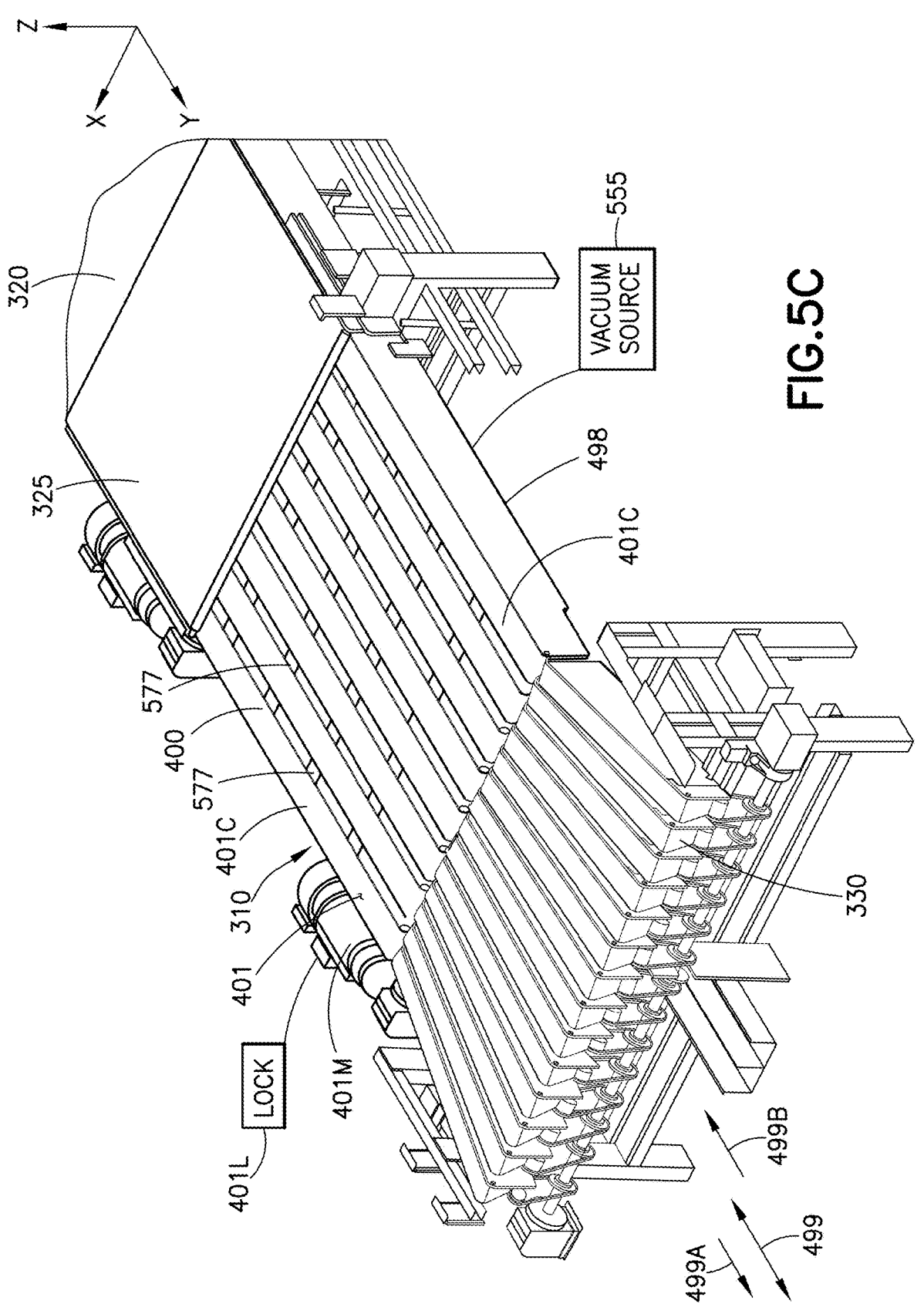
FIG. 5C is a schematic perspective illustration of a portion of the bottom slip sheet removal system of FIG. 3 in accordance with aspects of the disclosed embodiment.
Figure 6:
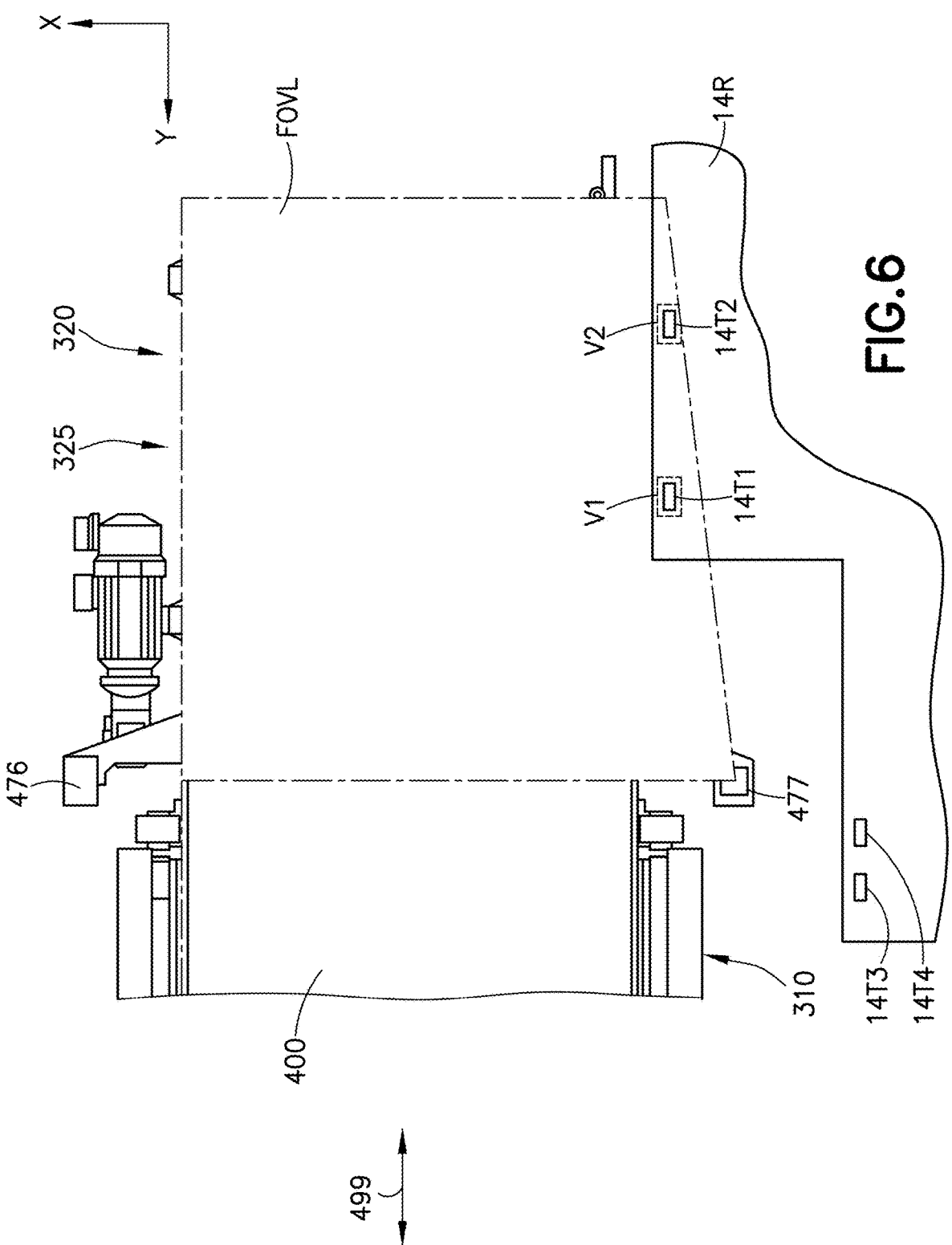
FIG. 6 is a schematic plan view of a portion of the bottom slip sheet removal system of FIG. 3 in accordance with aspects of the disclosed embodiment.
Figure 7:
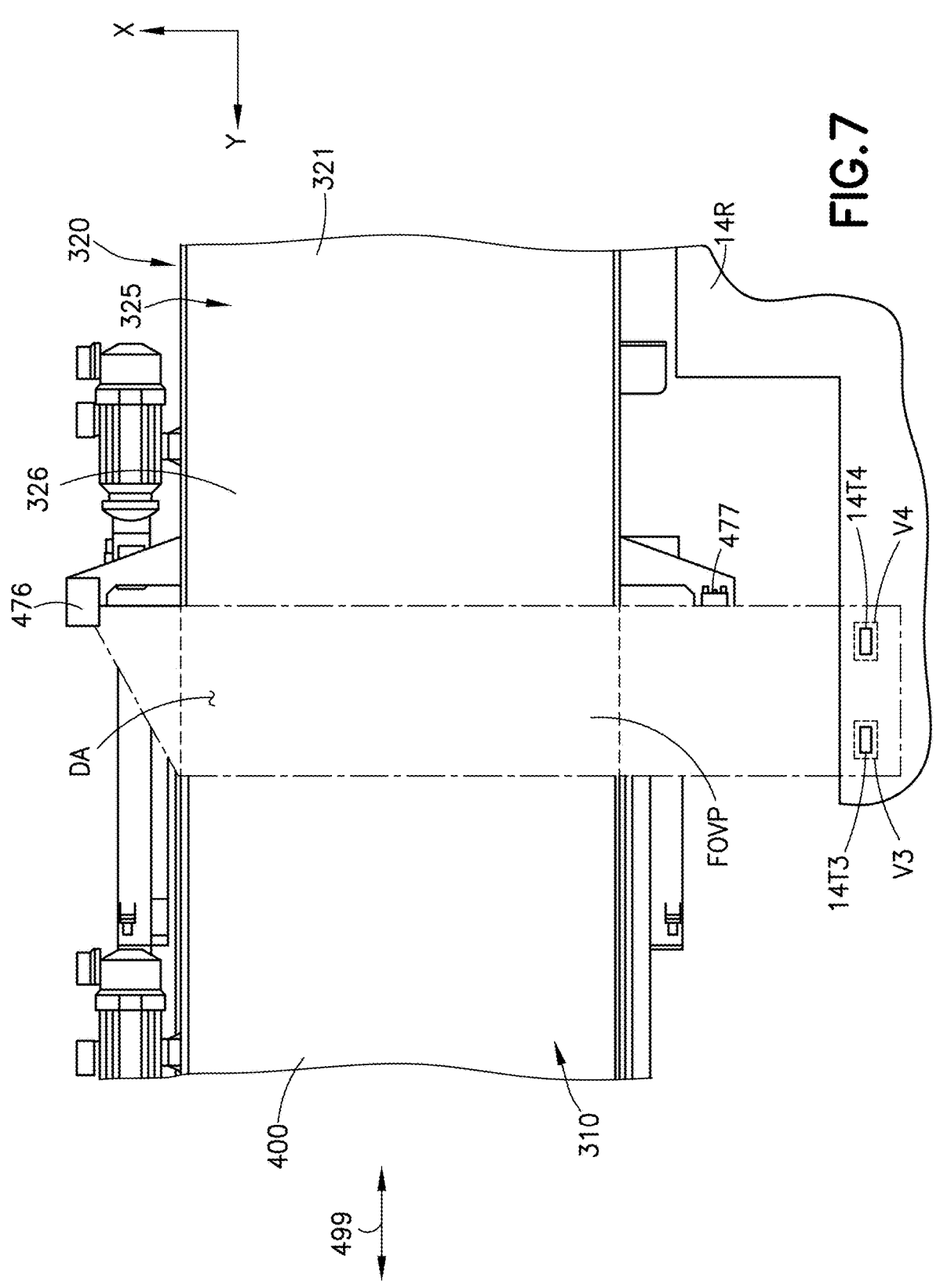
FIG. 7 is a schematic plan view of a portion of the bottom slip sheet removal system of FIG. 3 in accordance with aspects of the disclosed embodiment.

Referring to FIGS. 3, 4A, 4B, 5A, 5B, 5C, 14A, 14B, 15A, and 15B, the bottom slip sheet remover 310 includes a frame 498A, a conveyor portion 400 (which is a portion of the accumulation conveyor 325), a pusher 420 (also referred to as displacer 420, see FIGS. 3, 4A and 4B), and at least a portion of the intelligent detection system (e.g., such as a slip sheet detector 1400, which forms what may be referred to as a slip sheet detection sensor). The frame 498A of the bottom slip sheet remover 310 is another portion of the frame 498 of the slip sheet removal system 300 and is coupled to the frame 498B in any suitable manner. The conveyor portion 400 (which may be substantially similar to mat top conveyors 321, 326) is coupled to the frame 498A in any suitable manner (or is otherwise integrally formed with the frame 498A) and is configured to transport the seated pallet layer PL (and the cases CU thereof-see FIGS. 16A-17B) generally along a conveyance direction 499 (noting that the direction 499A corresponds with the respective in/out case conveyor 150 operating in an inbound role and the direction may be reversed, see direction 499B, with the respective in/out case conveyor 150 operating in an outbound role). The conveyor portion 400 includes any suitable conveyance surface(s) 401 configured with a substantially uniform (e.g., common or steady state) coefficient of friction for effecting at least conveyance of the pallet layer PL along the conveyance direction 499. For example, as illustrated in FIG. 5A the conveyance surface is 401 formed by a substantially continuous/solid rubber top (endless) belt 401R. As another example, as illustrated in FIG. 5B the conveyance surface 401 is formed by a perforated rubber top (endless) belt 401P. As yet another example, the conveyance surface(s) 401 is/are formed of more than one rubber top (endless) belt 401C (e.g., cassette style conveyor sections). While the conveyor tops are described herein as being rubber in other aspects the conveyor tops may be formed of any suitable material having a coefficient of friction that effects both conveyance of the pallet layer PL and retention of a slip sheet 277 in the manner described herein for slip sheet 277 removal. The conveyor portion 400 includes any suitable motor 401M configured to drive the conveyance surface 401 to effect conveyance of the pallet layer PL (and the cases CU thereof) at least along the conveyance direction 499. As can be seen in FIGS. 5A, 5B, and 5C the motor 401M includes any suitable lock 401L configured to arrest motion of the conveyance surface 401 in the conveyance direction 499 and hold the conveyance surface 401 substantially stationary relative to the conveyance direction 499. The lock 401L may be configured as a friction brake (e.g., clutch brake, etc.), magnetic brake (e.g., eddy current magnetic brake, etc.), or any other suitable brake configured to arrest and maintain substantially stationary the conveyance surface 401.

As can be seen in FIGS. 3, 4A, and 4B the pusher or displacer 420 is movably coupled to the layer place conveyor 320 and, as described herein, is actuable in a direction that is aligned with the conveyance traverse direction 499. As described herein the displacer is actuable between an advanced position (see FIGS. 16B and 17B) and a retracted position (see FIGS. 3, 16A, and 17A) that displaces the pallet layer PL and the slip sheet 277 on the bottom surface of the pallet layer relative to each other (as described herein) stripping the pallet layer PL and slip sheet 277 from each other. The pusher 420 includes at least one traverser 430, each traverser 430 having a linear actuator 430L, a carriage 430C coupled to the linear actuator 430L, and a pusher bar 435 pivotally coupled to the carriage 430C so as to be actuable to raise and lower to and from an engaged or deployed position (see, e.g., FIGS. 4A, 4B, and 8) and a disengaged or retracted position (see, e.g., FIGS. 3, 9, 10, and 13) as described herein. The linear actuator 430L is coupled to and extends along the frame 498A in a direction substantially parallel with the conveyance direction 499. The linear actuator 430L is any suitable linear actuator (e.g., hydraulic or pneumatic cylinder, electric drive, belt/chain drive, gear drive, etc.) configured to move the carriage 430C along the frame 498A in conveyance directions 499A, 499B in a reciprocating movement. The pusher bar 435 is pivotally coupled to the carriage 430C so as to move as a unit with the carriage 430C along the conveyance direction 499. The carriage 430C includes any suitable drive (e.g., motor, actuator, transmission, etc.) 430CD connected to the pusher bar 435 and configured to pivot the pusher bar in direction 495 between the deployed position (illustrated in FIGS. 4A, 4B, and 8) and the retracted position (illustrated in FIGS. 3, 9, 10, and 13). With the pusher bar 435 in the retracted position, the pallet layer PL is conveyed by and between the accumulation conveyor 325 and the conveyor portion 400 of the bottom slip sheet remover 310 along the conveyance direction 499 (and by and between the conveyor portion 400 of the bottom slip sheet remover 310 and the spreader conveyor 330 in conveyance direction 499). With the pusher bar 435 in the deployed position, the pusher bar 435 (with actuation of the linear actuator 430L) pushes the pallet layer from the conveyor portion 400 of the bottom slip sheet remover 310 (with the conveyor portion 400 held stationary) in the conveyance direction 499A to effect removal of a slip sheet 277 in the manner described herein, such as by moving the pallet layer PL and slip sheet 277 relative to each other to strip the pallet layer PL off of the slip sheet 277.

In the aspect illustrated in FIG. 4A the bottom slip sheet remover 310 includes two traversers 430 (e.g., one traverser on each lateral side LAT1, LAT2 of the bottom slip sheet remover 310). Each traverser 430 includes a respective pusher bar 435 that spans about half the width (e.g., the width of the conveyor portion 400 between the lateral sides LAT1, LAT2) of the conveyor portion 400 so that the combined span of the respective pusher bars 435 spans across the pallet layer PL for pushing the pallet layer, in its entirety, from the conveyor portion 400 as described herein. Here, the bottom slip sheet remover 310 illustrated in FIG. 4A includes two opposing pusher bars 435 that are operated in a coordinated manner (e.g., the traversers 430 rotate the respective pusher bars 435 to the deployed position and move the pusher bars 435 substantially simultaneously at the same rate of movement in direction 499A) to collectively push a pallet layer PL from the conveyor portion 400 of the accumulator conveyor 325 to the spreader conveyor 330.

In the aspect illustrated in FIG. 4B the bottom slip sheet remover 310 includes one traverser 430 on a lateral side (e.g., either of lateral side LAT1 or lateral side LAT2) of the bottom slip sheet remover 310. The traverser 430 includes a respective pusher bar 435 that spans about the entire width (e.g., the width of the conveyor portion 400 between the lateral sides LAT1, LAT2) of the conveyor portion 400 so that the span of the respective pusher bar 435 spans across the pallet layer PL for pushing the pallet layer, in its entirety, from the conveyor portion 400 as described herein. Here, the bottom slip sheet remover 310 illustrated in FIG. 4B includes a single pusher bar 435 that is operated (e.g., the traverser 430 rotates the respective pusher bar 435 to the deployed position and moves the pusher bar 435 in direction 499A) to push a pallet layer PL from the conveyor portion 400 of the accumulator conveyor 325 to the spreader conveyor 330.

While one pusher bar 435 or two pusher bars 435 are illustrated in the figures it should be understood that the bottom slip sheet remover may have more than two pusher bars.

As can be seen best in FIGS. 14A, 14B, 15A, 15B, and as noted above, the bottom slip sheet remover 310 includes a portion of the intelligent detection system of the slip sheet removal system 300. The portion of the intelligent detection system included with the bottom slip sheet remover 310 is the slip sheet detector 1400. As described herein, the slip sheet detector 1400 is coupled to the layer place conveyor 320 and arranged to sense a slip sheet 277 in contact with the seated pallet layer PL on at least one of an uppermost surface PLUS and a bottom surface PLLS of the seated pallet layer (see FIG. 15B where the pallet layer PL is illustrated without a slip sheet for illustrative purposes only). Here, the slip sheet detector 1400 is disposed (as described herein) to sense the slip sheet 277 on the at least one of the uppermost surface PLUS and the bottom surface PLLS of the seated pallet layer PL. As described herein, the slip sheet detector 1400 is disposed to sense the slip sheet 277 on the at least one of the uppermost surface PLUS and the bottom surface PLLS of the seated pallet layer PL with the pallet layer PL seated on the conveying surface (e.g., one or more of conveying surfaces 321CS, 326CS, 401) of the layer place conveyor 320.

The slip sheet detector 1400 includes a sub-frame 498S, a scanner 1405, and a mirror 1410 (e.g., an optical mirror or other suitable mirror/reflective surface). The sub-frame 498S is configured for coupling with the frame 498 of the bottom slip sheet remover 310; however, in other aspects the sub-frame 498S may be configured for coupling with a frame 498B of the accumulator conveyor 325/layer place conveyor 320. The scanner 1405 is any suitable scanner/sensor configured with a substantially planar field of view FOVS that can be extended through a gap 485 formed in the accumulation conveyor 325 between the conveyance surface 401 of conveyor portion 400 of the bottom slip sheet remover 310 and the mat top conveyor belt 326 so as to detect spaces (e.g., distance 1700) between adjacent cases CU (see FIG. 17A). As an example the scanner 1405 is an electromagnetic beam sensor arranged so as to emit a sensing beam (see, e.g., FIG. 15A) in a direction that crosses a seating plane SP (see FIG. 15B) of the conveying surface 321CS, 326CS, 401 so as to sense the slip sheet 277 on the at least one of the uppermost surface PLUS and the bottom surface PLLS of the seated pallet layer PL. As another example, the scanner 1405 is an imaging sensor (e.g., two dimensional presence sensors such as ranging laser scanners, LIDAR scanners, two-dimensional ranging optical scanners/sensors, sonic ranging sensors, time-of-flight cameras, etc.) registering (e.g., in any suitable memory, such as of controller 333 or other suitable controller) the slip sheet 277 on the at least one of the uppermost surface PLUS and the bottom surface PLLS of the seated pallet layer PL in the direction crossing the seating plane SP of the seated pallet layer PL seated on the conveying surface 321CS, 326CS, 401. The scanner 1405 may be any suitable electromagnetic beam scanner or other suitable optical scanner.

The scanner 1405 is coupled to the sub-frame 498S by an adjustable mount 1450; however, in other aspects the scanner 1405 may be fixed to the sub-frame 498S in any suitable manner. The adjustable mount 1450 includes at least one stage of adjustment, such as in one or more of the X, Y, Z, Rx, Ry, and Rz directions. The Y direction is substantially coincident with e.g., substantially parallel with) the conveyance direction (also referred to as conveyance traverse direction) 499, the X direction is transverse to (e.g., substantially perpendicular to) the conveyance direction 499 within a plane defined by the conveyance surface 401, and the Z direction is transverse to the conveyance direction 499 and is substantially perpendicular to the plane defined by the conveyance surface 401. Rx, Ry, and Rz are respectively rotation directions about the X, Y, and Z axes (see FIGS. 3, 14A, 14B, and 15B). As an example, the adjustable mount 1450 includes a Z axis stage 1450Z (e.g., rack and pinion, ball screw, or other linear/rotary actuator) configured to raise or lower the scanner 1405 along the Z axis. The adjustable mount 1450 may also include an X axis stage 1450X (e.g., jack screw or other linear/rotary actuator) configured to tilt the scanner about the X axis in direction Rx. The adjustable mount 1450 may also include a Y axis stage 1450Y (e.g., jack screw or other linear/rotary actuator) configured to tilt the scanner about the Y axis in direction Ry.

The mirror 1410 is coupled to the sub-frame 498S so as to reflect/change a direction of radiation (and the field of view FOVS defined thereby) emitted from the scanner 1405, or in other aspects, reflect/change the field of view FOVS/radiation of any other suitable imaging sensor such as those described herein. Here, the radiation (and/or field of view) extends from the scanner 1405 and is redirected by the mirror 1410 through the gap 485 to the slip sheet 277 or cases CU where the radiation is then reflected by the slip sheet 277 or cases CU back through the gap 485 and is redirected by the mirror 1410 to the scanner 1405. The mirror 1410 may be fixedly coupled to the sub-frame 498S and the sub-frame 498S is positioned on the one of frame

498A, 498B so that the mirror is aligned with the gap 485 for redirecting the radiation from the scanner through the gap 485. In one or more aspects the mirror 1410 may be mounted to the sub-frame 498S about a pivot axis 1411 so that the position of the mirror 1410 in direction $R_{X1}$ may be adjusted to effect the return of the radiation from the slip sheet 277 or cases CU to the scanner 1405.

One or more air knives 1460, 1461 are mounted to the sub-frame 498S in any suitable manner and are configured for cleaning a reflective surface of the mirror 1410 (i.e., the surface of the mirror that redirects the radiation from/to the scanner 1405) and a lens of the scanner 1405 (i.e., the radiation being emitted from and received through the lens). The air knife 1460 is coupled to the sub-frame 498S adjacent the scanner 1405 and extends adjacent at least a portion of the scanner 1405 to eject a stream of compressed air across the lens to clean the lens. The air knife 1461 is coupled to the sub-frame 498S adjacent the mirror 1410 and extends adjacent at least a portion of the mirror 1410 to eject a stream of compressed air across the mirror 1410 to clean the reflective surface. In other aspects, the mirror 1410 may be manually cleaned in any suitable manner. The air knives 1460, 1461 may be activated at the same time or at different times and at any suitable time intervals between activations. The activation of each air knife 1460, 1461 may be for any suitable duration that effects cleaning of a respective one of the reflective surface and lens.

One or more presence sensors 476, 477 are coupled to the frame 498B in any suitable manner and may also form a part of the intelligent detection system of the bottom slip sheet removal system 300. While the one or more presence sensors 476, 477 are illustrated as being coupled to the frame 498B, in other aspects at least one of the one or more presence sensors 476, 477 may be coupled to frame 498A, 498B of the bottom slip sheet remover 310 in any suitable manner. The presence sensors 476, 477 may be any suitable two dimensional presence sensors such as ranging laser scanners, LIDAR two-dimensional ranging scanners, optical scanners/sensors, sonic ranging sensors, time-of-flight cameras, etc.

The sensor 477 is coupled to the frame 498B (or frame 498A) and is positioned relative to both the accumulation conveyor 325 and layer place conveyor 320 so that a field of view FOVL of the sensor 477 covers substantially the entirety of the conveying surface of both the accumulation conveyor 325 and layer place conveyor 320. Here, the sensor 477 provides sensor signals to the controller 333 (which may be conveyed to the controller 10C of the palletizer cell 10), where the sensor signals indicate a presence or absence of items on the mat top conveyor belts 321, 326 that may otherwise prevent/obstruct placement of a pallet layer PL by one or more robotic case manipulator(s) 14 of the palletizer cell 10. With the mat top conveyor belts 321, 326 substantially free of obstructions the one or more robotic case manipulator(s) 14 place pallet layers PL to the layer place conveyor 320.

The field of view FOVL of the sensor 477 may include one or more validation zones V1, V2 (e.g., see FIG. 6) for a self-alignment check of the presence sensor 477 relative to the X and Y axes. For example, the robotic case manipulator(s) 14 riser/support 14R (shown in the figures with an exemplary configuration but may have any suitable configuration) includes at least two targets 14T1, 14T2 (e.g., see FIG. 6) that are disposed in a known position relative to the frame 498 and the presence sensor 477 (it is noted that the field of view of sensor 477 (and sensor 476) may extend beyond what is shown in the figures to detect the location of targets disposed on the risers in a manner similar to that described herein and the fields of view and target positions shown in the figures is for illustrative purposes only). Where a position of each of the targets 14T1, 14T2 detected by the presence sensor 477 is located in a respective one of the validation zones V1, V2 (e.g., within a predetermined tolerance) alignment of the presence sensor 477 is validated. Where the position of one or more of the targets 14T1, 14T2 detected by the presence sensor 477 is located outside a respective one of the validation zones V1, V2 the self-alignment check is failed and the controller 333 may provide an indication (e.g., visual, aural, etc.) to a human operator that at least the presence sensor 477 should be serviced. In other aspects, the targets 14T1, 14T2 may be located in any suitable location, such as on the frame 498 of the slip sheet removal system 300.

The sensor 476 is coupled to the frame 498B (or frame 498A) and is positioned relative to a conveyor of the bottom slip sheet remover 310 so that a field of view FOVP of the sensor 476 extends over at least an area DA (see also FIG. 10) of the conveyor portion 400 at which the at least one pusher bar 435 is rotated to the deployed position. Here, the sensor 476 provides sensor signals to the controller 333 (which may be conveyed to the controller 10C of the palletizer cell 10), where the sensor signals indicate a presence or absence of items on the conveyor portion 400 that may otherwise prevent deployment of the at least one pusher bar 435. With no items present in at least the area DA of the conveyor portion 400 the at least one pusher bar 435 is rotated to the deployed position. The field of view FOVP of the sensor 476 may include one or more validation zones V3, V4 (e.g., see FIG. 7) for a self-alignment check of the presence sensor 476 relative to the X and Y axes. For example, the robotic case manipulator(s) 14 riser 14R includes at least two targets 14T3, 14T4 (e.g., see FIG. 7) that are disposed in a known position relative to the frame 498 and the presence sensor 476. Where a position of each of the targets 14T3, 14T4 detected by the presence sensor 476 is located in a respective one of the validation zones V3, V4 (e.g., within a predetermined tolerance) alignment of the presence sensor 476 is validated. Where the position of one or more of the targets 14T3, 14T4 detected by the presence sensor 476 is located outside a respective one of the validation zones V3, V4 the self-alignment check is failed and the controller 333 may provide an indication (e.g., visual, aural, etc.) to a human operator that at least the presence sensor 476 should be serviced. In other aspects, the targets 14T3, 14T4 may be located in any suitable location, such as on the frame 498 of the slip sheet removal system 300.

The spreader conveyor 330 includes a frame 498C (e.g., see FIGS. 3 and 5A-5C) that forms part of the frame 498 of the slip sheet removal system 300. The frame 498C is coupled to the frame 498A in any suitable manner so as to position the spreader conveyor 330 adjacent the bottom slip sheet remover 310. The spreader conveyor 330 includes cassette style conveyor sections 331. Each cassette style conveyor section 331 includes a mat top conveyor belt 331B. The cassette style conveyor sections 331 are angled relative to each so that as cases CU travel along the spreader conveyor 330 in the conveyance direction 499A the cassette style conveyor sections 331 spread (i.e., increase the distance between) the cases CU away from each other in the X direction (i.e., in a direction transverse to the conveyance direction 499A) as illustrated in FIGS. 16B and 17B. The cassette style conveyor sections 331 may also be operated by, e.g., controller 333 (e.g., see FIG. 3) so that the mat top conveyor belts 331B of the cassette style conveyor sections 331 operate at a faster rate/speed compared to the conveyor portion 400 of the bottom slip sheet remover 310 to that a distance or gap 1600 between case units CU in the Y direction is increased in a manner substantially similar to that described herein with respect to the transition of cases CU between the layer place conveyor 320 and the accumulator conveyor 325. As with the bottom slip sheet remover 310, the accumulator conveyor 325, and the layer place conveyor 320, the spreader conveyor 330 may also operate to convey the cases CU in direction 499B such that the cases CU flow in direction 499B in a manner substantially opposite to that described above.

Figure 16A:
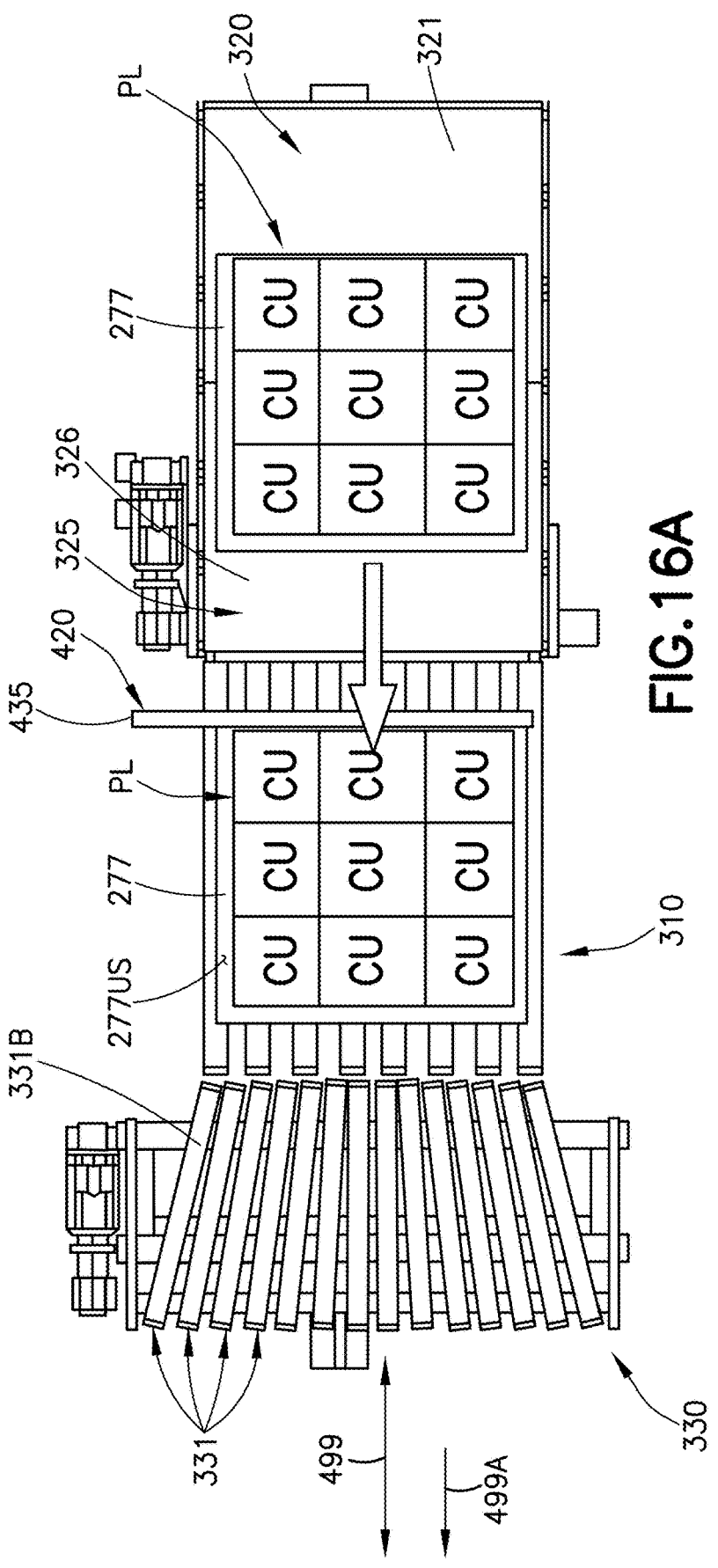
FIG. 16A is a schematic plan view of a portion of the bottom slip sheet removal system of FIG. 3 in accordance with aspects of the disclosed embodiment.
Figure 16B:
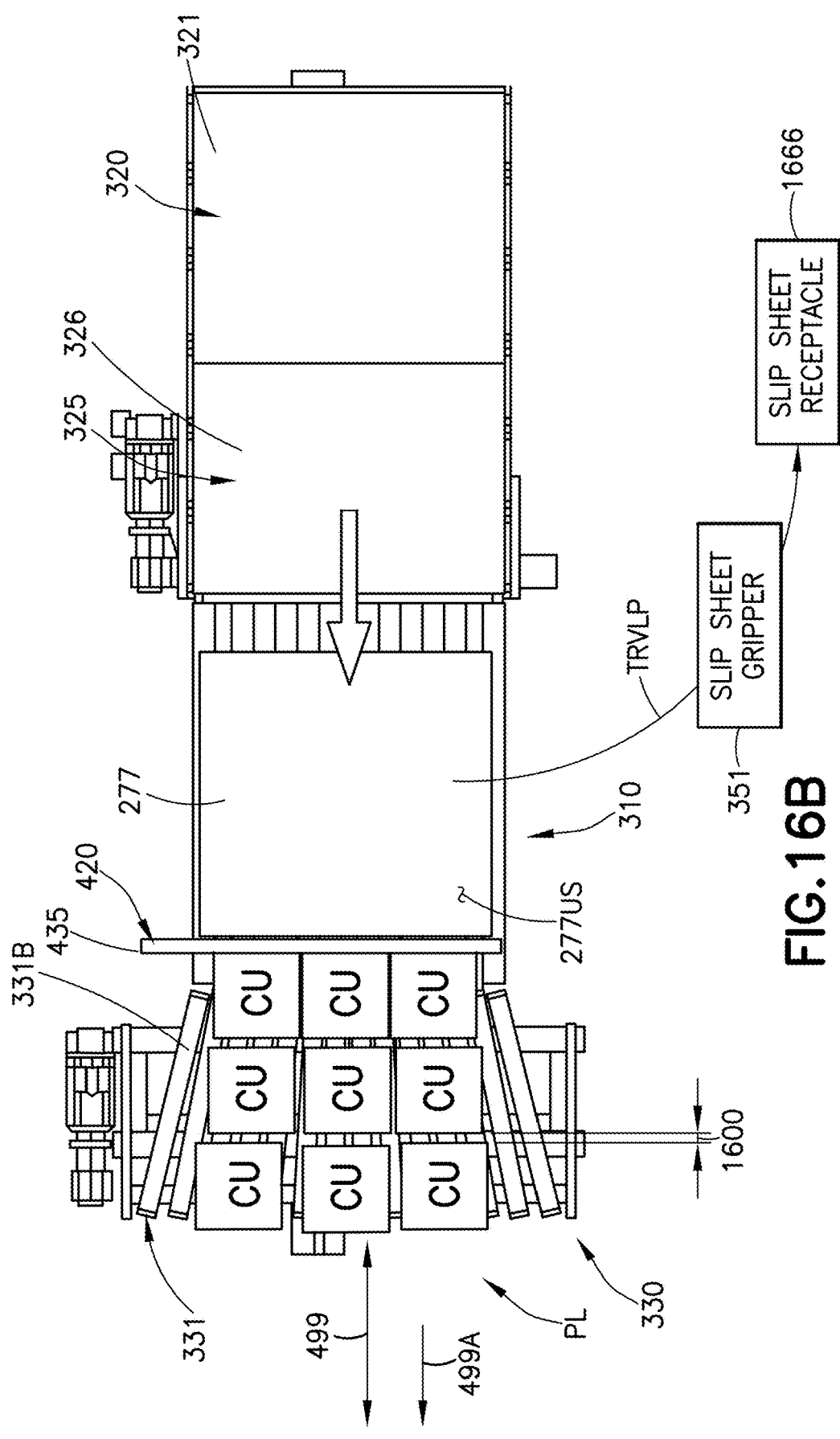
FIG. 16B is a schematic plan view of a portion of the bottom slip sheet removal system of FIG. 3 in accordance with aspects of the disclosed embodiment.
Figure 17A:
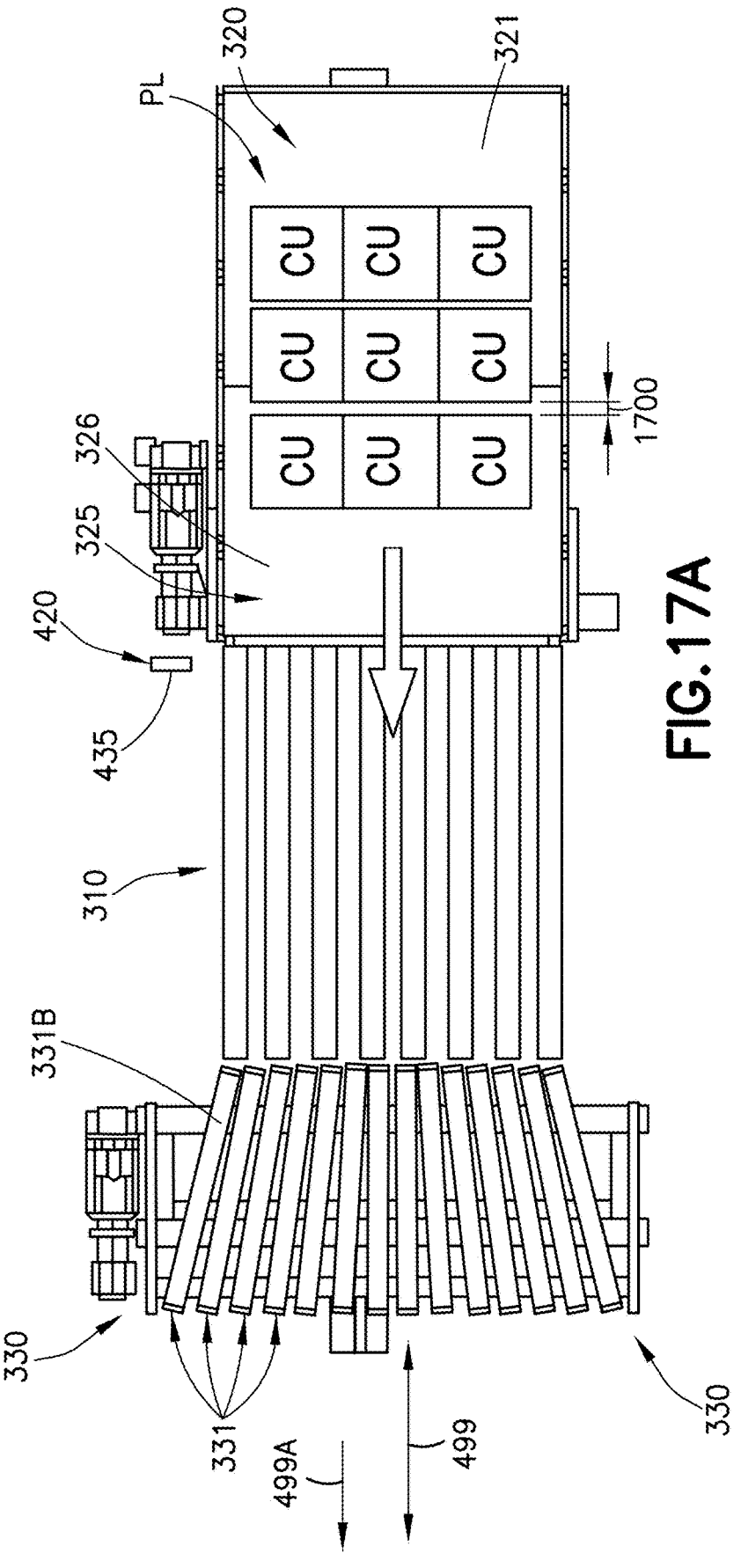
FIG. 17A is a schematic plan view of a portion of the bottom slip sheet removal system of FIG. 3 in accordance with aspects of the disclosed embodiment.
Figure 17B:
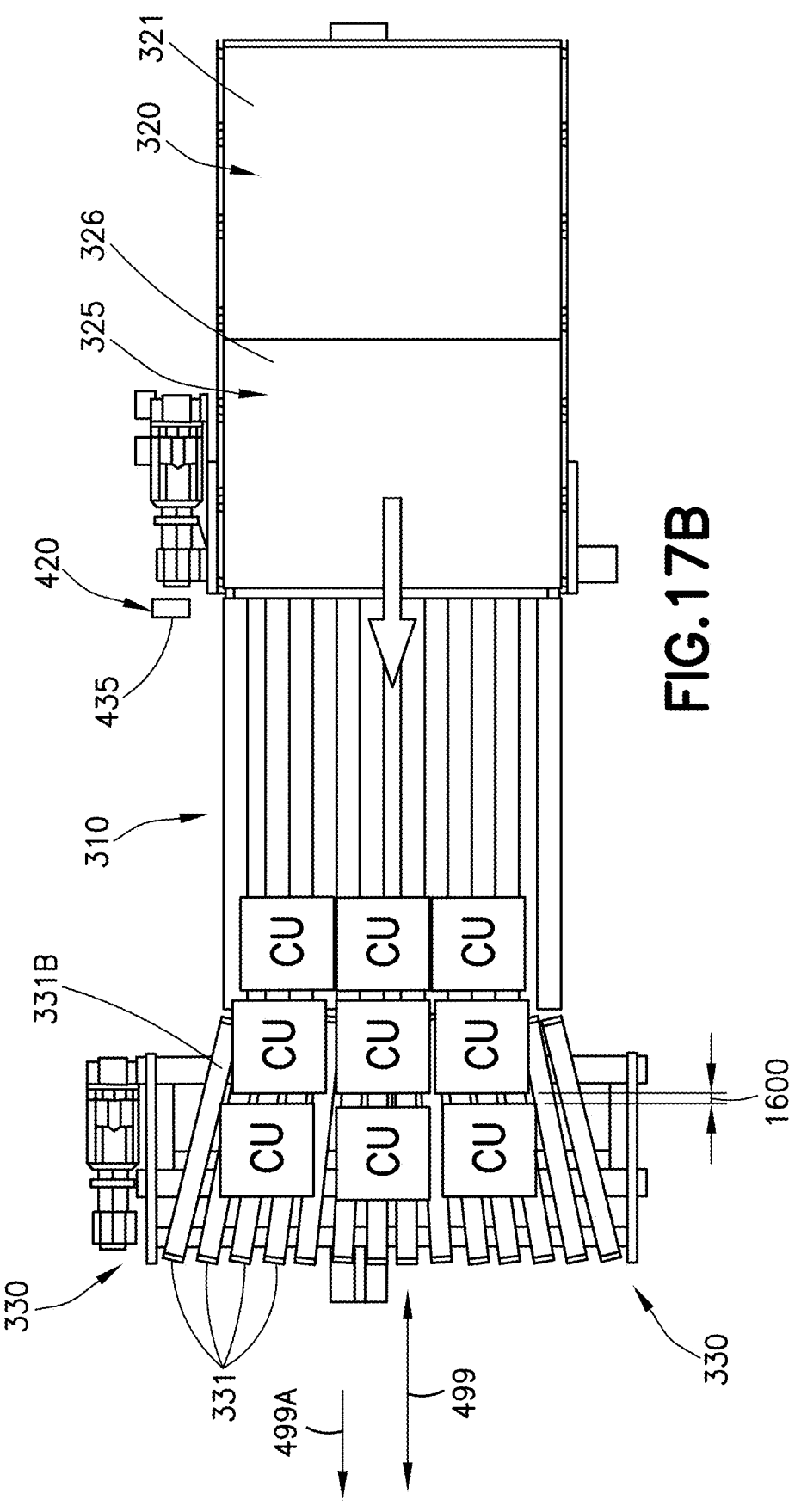
FIG. 17B is a schematic plan view of a portion of the bottom slip sheet removal system of FIG. 3 in accordance with aspects of the disclosed embodiment.

Referring to FIGS. 3, 16A, and 16B, as described above, the slip sheet removal system 300 may include a slip sheet remover 350 (also referred to as slip sheet pickup removal mechanism 350). The controller 333 is operably connected to the slip sheet remover 350 so as to actuate the slip sheet remover 350 engaging the slip sheet 277, with the slip sheet contacting the at least one of the uppermost surface PLUS and the bottom surface PLLS, and lifting the slip sheet 277 effecting discharge of the slip sheet off the accumulator conveyor 325 (also referred to as a layer seating platform). The actuation of the slip sheet remover 350 (as described herein) is based on the signal received from the slip sheet detection sensor.

The slip sheet remover 350 extends at least in part over the layer place conveyor 320 and is configured so as to engage, above the layer place conveyor 320, the slip sheet 277 contacting the at least one of the uppermost surface PLUS and the bottom surface PLLS of the seated pallet layer PL. The slip sheet remover 350 is disposed at least partially above the bottom slip sheet remover 310 and includes a slip sheet gripper 351 (also referred to as pick head 351) configured to grip or otherwise engage an upper surface 277US of a slip sheet 277 held on the conveyor portion 400 of the accumulator conveyor 325 (or on the uppermost surface PLUS of the pallet layer PL-noting upper surface 277UC is shown in FIGS. 16A and 16B as being underneath the pallet layer PL but may otherwise be on the uppermost surface PLUS of the pallet layer PL as described herein) and transport the gripped slip sheet 277 to any suitable slip sheet receptacle 1666 (e.g., bin, pallet, etc.). The slip sheet remover 350 includes a frame 355 configured to movably suspend the slip sheet gripper 351 above the conveyor portion 400. For example, the frame includes one or more stanchions/supports 356 that extend from a floor of a warehouse facility in which the warehouse system 100WS is disposed. The stanchions 356 support an overhead gantry 370 that carries the slip sheet gripper 351. While the overhead gantry 370 is described as being supported by stanchions 356 in other aspects the overhead gantry 370 may be suspended from a ceiling of the warehouse facility.

The overhead gantry 370 includes at least one horizontal traverse axis and a vertical traverse axis. The at least one horizontal traverse axis includes any suitable linear actuator 371L (e.g., piston, belt drive, chain drive, etc.) configured to move a gantry carriage 371 (of the slip sheet remover 350) along the X direction. The gantry carriage 371 includes any suitable linear actuator 372L (similar to those described herein) configured to move a Z-axis carriage 372 along the Z direction. The Z-axis carriage 372 is carried by and moves with the gantry carriage 371 as a unit along the X direction. The slip sheet gripper 351 is carried by the Z-axis carriage 372 so that a combination of the gantry carriage 371 and the Z-axis carriage 372 provide the slip sheet gripper 351 with at least two degrees of freedom movement (e.g., in the X and Z directions).

In some aspects, the Z-axis carriage 372 may include any suitable linear actuator 373L (similar to those described herein) and a Y axis carriage 373. The Y axis carriage 373 is moved by the linear actuator along the Y axis to provide the slip sheet gripper 351 with a third degree of freedom movement.

The slip sheet remover 350 is coupled to the controller 333 so that the slip sheet gripper 351 is moved along one or more of the X, Y, and Z axes to pick a slip sheet 277 (e.g., see FIG. 16B) from the conveyor portion 400 of the accumulator conveyor 325 and transport the slip sheet 277 to the slip sheet receptacle 1666 to effect automatic removal of the slip sheet 277 from underneath the pallet layer PL as described herein. Here, a direction in which the slip sheet remover 350 moves (e.g., a travel path TRVLP—see FIG. 16B for an exemplary travel path although any suitable path may be followed) is such that layer place conveyor 320 feed of a next or subsequent pallet layer is unencumbered as will be described herein.

The slip sheet gripper 351 is configured as a vacuum gripper that includes suction holes or cups 387 that releasably grip (e.g., under control of controller 333) the slip sheet 277. A vacuum source 388 for the suction holes or cups 387 may be disposed on the slip sheet gripper 351 or supported on one of the frame 355, the Z-axis carriage 372, and the Y axis carriage 373 and be communicably coupled to the suction holes or cups 387 in any suitable manner. In other aspects the slip sheet gripper 351 is configured to grip and release a slip sheet 277 in any suitable manner.

In other aspects, the slip sheet 277 may be manually removed from the conveyor portion 400. In still other aspects, the slip sheet 277 may be automatically removed from the conveyor portion 400 by redirecting the slip sheet 277 through a gap 390 (see FIG. 3) between the conveyor portion 400 of the accumulator conveyor 325 and the mat top conveyor belts 331B of the spreader conveyor 330 in any suitable manner such as in a manner similar to that described in U.S. patent application Ser. No. 17/070,753 filed on Oct. 14, 2020 and titled "Vision-assisted Robotized Depalletizer", the disclosure of which was previously incorporated herein by reference in its entirety.

Referring to FIGS. 3 and 8-13, in operation the at least one pusher bar 435 of the bottom slip sheet remover 310 has several operating positions. At startup/initialization of the bottom slip sheet remover 310 the push face PF (see also FIGS. 4A and 4B) of the pusher bar 435 is moved to a homing position (see FIG. 8) where the homing position is a predetermined distance Y1 relative to a datum plane DP of the frame 498A. While the at least one pusher bar 435 is shown as being in the deployed position while at the homing position, the at least one pusher bar 435 may be in the retracted position while at the homing position. The datum plane DP may correspond with a start point/location of travel of cases CU on the bottom slip sheet remover 310 (e.g., the "infeed edge" of the conveyor portion 400 or location where the cases first engage the conveyor portion 400 for conveyance by the bottom slip sheet remover 310). The predetermined distance Y1 may correspond with an end point/location of travel of cases CU on the bottom slip sheet remover 310 (e.g., the location where the cases disengage the conveyor portion 400 from conveyance by the bottom slip sheet remover 310). The location of the homing position may be defined by a stop surface 801 disposed at a predetermined location on the frame 498A relative to the datum plane DP. Here, the carriage 430C includes a stop surface 802 that has a known positional relationship with the push face PF. The carriage is driven in the conveyance direction 499A to engage the stop surface 801 where engagement between the surfaces 801, 802 is detected in any suitable manner (e.g., such as with force feedback, motor current measurement, proximity sensors, etc.). With the surfaces 801, 802 engaged (e.g., in substantial contact) the push face PF of the at least one pusher bar 435 is located at the distance Y1 from the datum plane DP so as to provide the controller 333 with a known location of the push face PF at startup/initialization of the bottom slip sheet remover 310.

The push face PF of the at least one pusher bar 435 may be located at a waiting position (see FIG. 9) at which the pusher bar 435 (e.g., the motors/actuators 430CD, 430L thereof) is positioned in anticipation for signals from the controller 333 for removing a slip sheet 277. In the waiting position the at least one pusher bar 435 is in the retracted position and the push face PF of the at least one pusher bar is located a predetermined distance Y2 from the datum plane DP. The predetermined distance Y2 is a distance that provides clearance for robotic case manipulator(s) 14 placement of pallet layers PL on the layer place conveyor 320. As will be described herein, where a slip sheet 277 is not present/detected underneath the pallet layer PL the at least one pusher arm 435 remains at the waiting position and the conveyor portion 400 of the accumulator conveyor 325 conveys the pallet layer from the bottom slip sheet remover 310 to the spreader conveyor 330.

With the controller 333 commanding removal of a slip sheet 277, the push face PF of the at least one pusher bar 435 is moved to a ready to lower position (FIG. 10) that is within the area DA (see also FIG. 7) of the sensor 476 field of view FOVP. To effect lowering of the at least one pusher bar 435 the push face PF of the at least one pusher bar 435 is moved to a predetermined distance Y3 from the datum plane DP, where the distance Y3 is within the bounds of the area DA. Here, with the slip sheet detected in the manner described herein, the pallet layer LP is conveyed in direction 499A to the end (prior to transition to the spreader conveyor 330) of the conveyor portion 400. The sensor 476 scans the area DA and determines the presence of objects within the area DA. With substantially no objects in the area DA the pusher bar 435 moves to a ready to push position (FIG. 11). In the ready to push position the push face PF remains within the area DA and the pusher bar 435 is lowered to the deployed position as illustrated in FIG. 11. The carriage 430C includes any suitable position/proximity sensors 1001, 1002 that detect or otherwise effect determination of whether the pusher bar 435 is in the retracted position or the deployed position.

Figure 13:
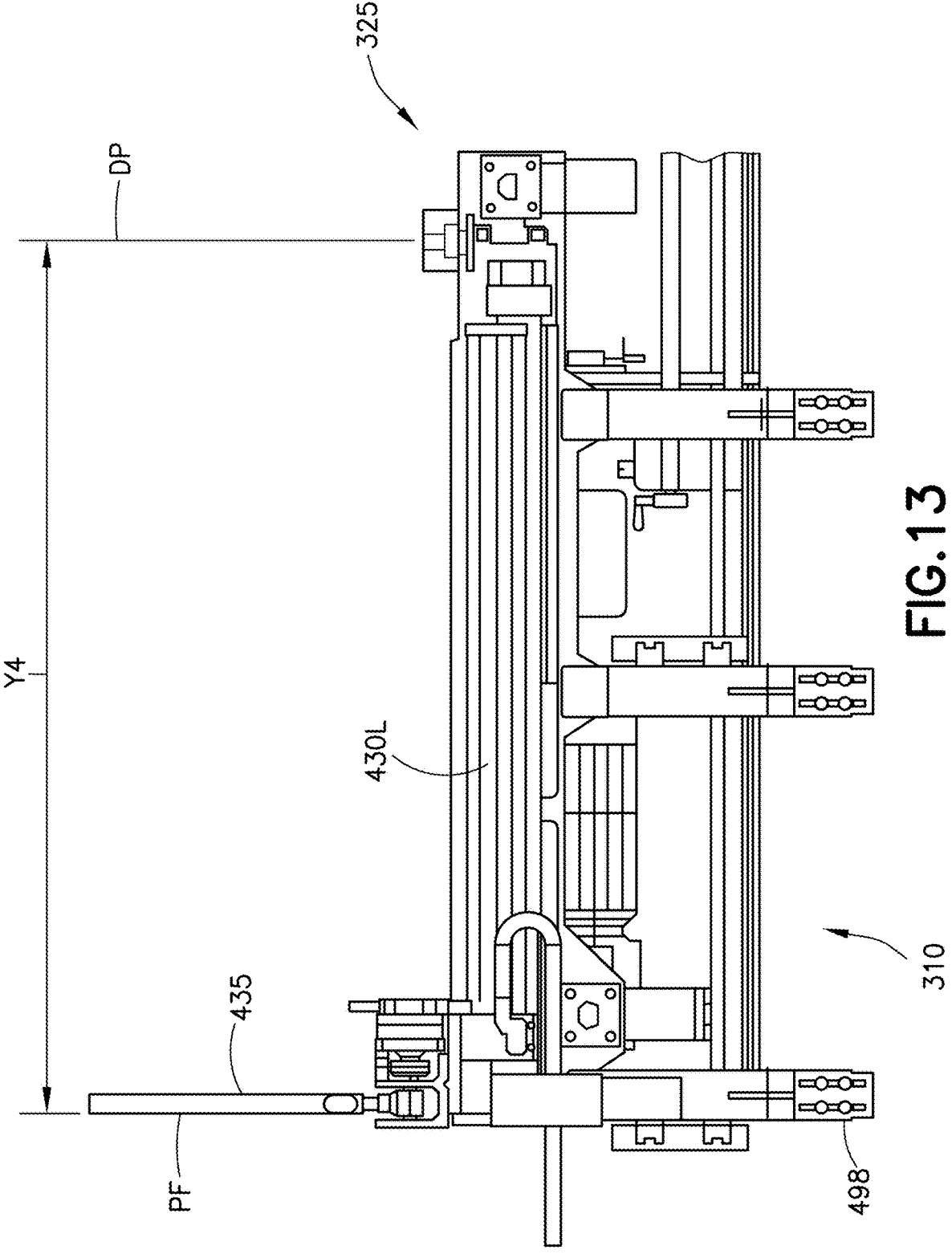
FIG. 13 is a schematic elevation view of a portion of the bottom slip sheet removal system of FIG. 3 in accordance with aspects of the disclosed embodiment.
Figure 14A:
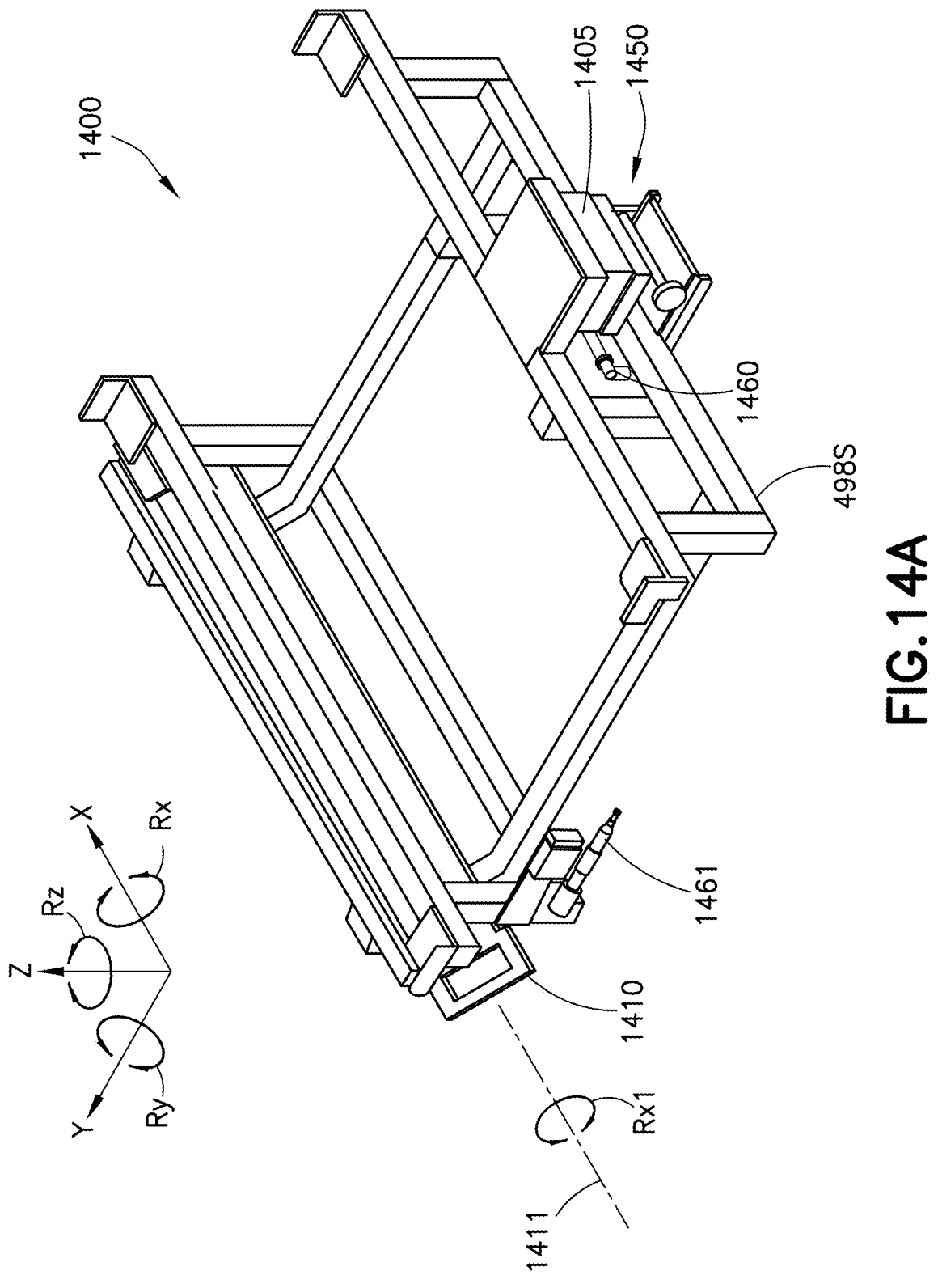
FIG. 14A is a schematic perspective illustration of a portion of the bottom slip sheet removal system of FIG. 3 in accordance with aspects of the disclosed embodiment.
Figure 14B:
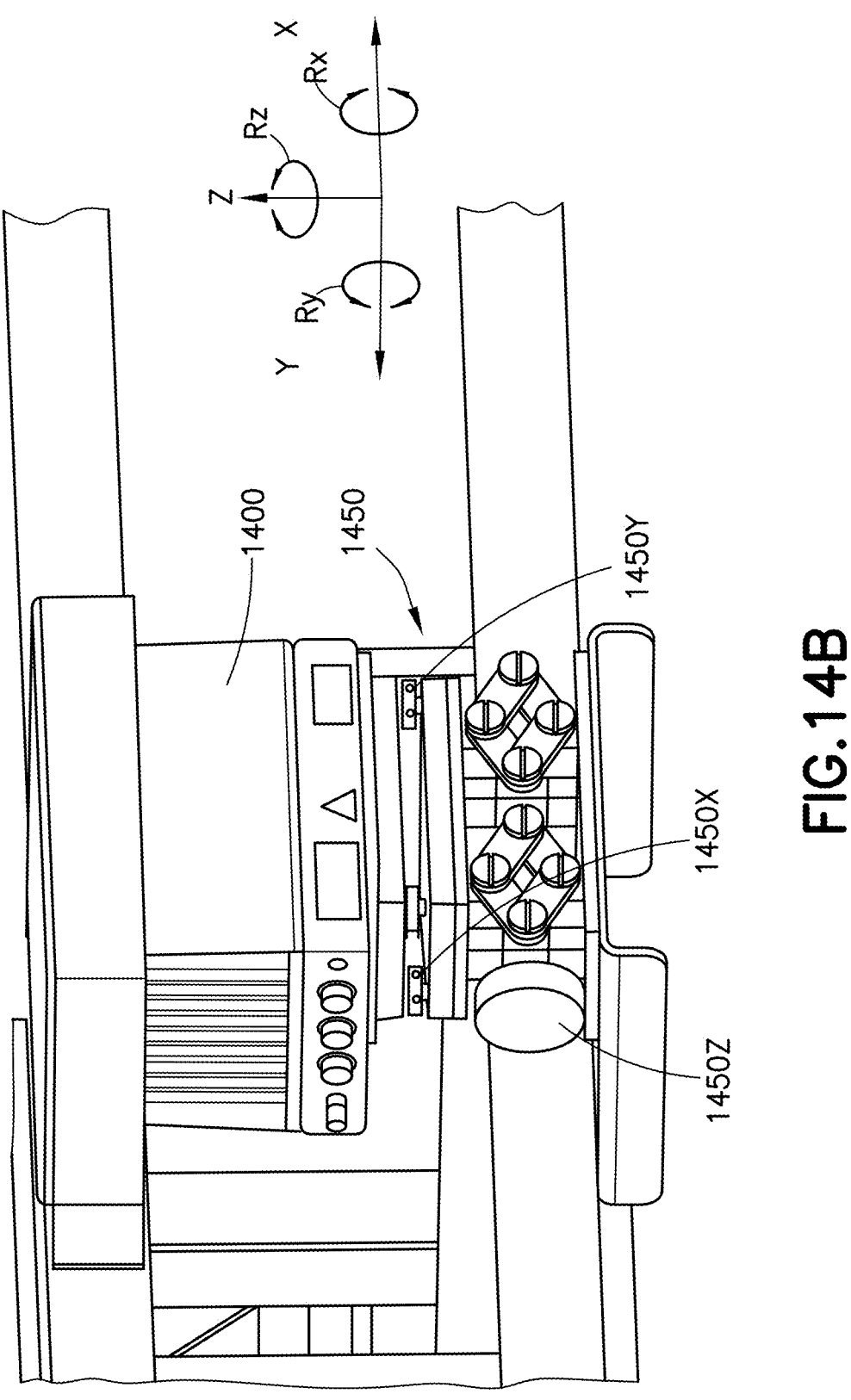
FIG. 14B is a schematic perspective illustration of a portion of the bottom slip sheet removal system of FIG. 3 in accordance with aspects of the disclosed embodiment.

From the ready to push position the pusher bar 435 is moved, e.g., under command of controller 333 and by actuator 430L, in the conveyance direction 499A to the push end position (FIG. 12) which is located a distance Y4 from the datum plane DP. With traverse of the pusher bar 435 from the ready to push position (FIG. 11) to the push end position (FIG. 12) the push face PF of the at least one pusher bar 435 pushes the cases CU of the pallet layer PL off of (i.e., strips the pallet layer PL off of) the slip sheet 277 and onto the spreader conveyor 330 (see FIGS. 16A and 16B) (it is noted that with the cases CU being pushed by the push face, the slip sheet gripper 351 is positioned above the conveyor portion 400 of the accumulator conveyor 325). With the cases CU of the pallet layer PL transferred to the spreader conveyor 330 the pusher bar is pivoted to the retracted position so that the pusher bar 435 is at a push end retracted position (FIG. 13). From the push end retracted position the pusher bar 435 is moved to the waiting position (FIG. 9) in anticipation of detection of another slip sheet 277 (noting that with the pusher bar 435 moving to the waiting position, the slip sheet gripper 351 moves to grip the slip sheet 277 on the conveyor portion 400). Here, the retraction of the pusher 420 (e.g., effecting movement of the pusher bar 435 to the waiting position) and slip sheet 277 pick up for discharge with the slip sheet remover 350 are decoupled from each other (e.g., picking of the slip sheet may be effected with the pusher bar 435 at the push end position, with the pusher bar 435 at the waiting position, or with the pusher bar moving from the push end position to the waiting position, where movement of the slip sheet remover 350 is independent from movement of the pusher 420) as will be described further herein. The retraction of the pusher 420 and the slip sheet 277 pick up for discharge with the slip sheet remover 350 are substantially coincident, at least in part (e.g., retracting movement of the pusher 420 and the picking movement of the slip sheet remover 350 may occur at the same time, at least for a portion of the respective movements). In one aspect, the pusher bar 435 closest to the slip sheet receptacle 1666 may be retracted in direction 495 to a greater extent than the pusher bar further from the slip sheet receptacle 1666 (see FIG. 4A) to provide clearance for the slip sheet 277 being transferred to the slip sheet receptacle 1666.

It is noted that the time it takes for the at least one pusher arm 435 to move from the waiting position and push the pallet layer PL may be less than a time it takes for the robotic case manipulator(s) 14 of the palletizing cell 10 to transfer a pallet layer PL to the layer place conveyor 320. The pushing of the pallet layer PL with the at least one pusher arm 435 occurs (e.g., the controller 333 coordinates the stopping of the conveyor portion 400 and the movement of the at least one pusher arm 435) such that stoppage of the pallet layer PL in the conveyance direction 499A on the bottom slip sheet remover 310 is minimized and the slip sheet removal system 300 provides a substantially steady state/continuous conveyance of pallet layers/cases in the conveyance direction 499A through the slip sheet removal system 300. For example, slip sheet 277 removal is decoupled from a state (e.g., on/conveying or off/not conveying) of the layer place conveyor 320 and movement of the pusher 420. As described herein, a direction in which the slip sheet remover 350 moves (e.g., a travel path-see FIG. 16B for an exemplary travel path although any suitable path may be followed) is such that layer place conveyor 320 feed of a next or subsequent pallet layer is unencumbered. Here, actuation of the slip sheet remover 350 may occur substantially coincident with the at least one pusher arm 435 stripping of the pallet layer PL from the slip sheet 277, such that removal of the slip sheet 277 by the slip sheet remover is substantially proximate (e.g., in time) to a trailing side of the pallet layer PL (e.g. the side of the pallet layer PL in substantial contact with the push face PF of the pusher bar 435) moving off of the slip sheet 277 (see FIG. 16B). As such, the slip sheet 277 is removed opportunistically with the layer place conveyor 320 in the same state for stripping the pallet layer PL from the slip sheet 277 (i.e., removal of the slip sheet is decoupled from the layer place conveyor 320 state—the layer place conveyor state remains unchanged for slip sheet removal). Here, substantially simultaneously with the slip sheet remover 350 lifting the slip sheet 277 from the accumulator conveyor 325, the layer place conveyor 320 is changed to the on state for conveyance of a next pallet layer. The next pallet layer is fed onto the layer place conveyor 320 substantially proximate (e.g., in time) slip sheet 277 removal and the travel path/direction of the slip sheet remover 350 is such that the feed of the next pallet layer along the layer place conveyor 320 is unencumbered. Here, the pallet layer PL being stripped from the slip sheet 277, the slip sheet 277 being opportunistically lifted from the accumulator conveyor 325, and the next or subsequent pallet layer PL being placed on the layer place conveyor occur proximate (e.g., in time) to each other such that a substantially steady state/continuous conveyance of pallet layers/cases in the conveyance direction 499A through the slip sheet removal system 300 is effected.

Figure 8:
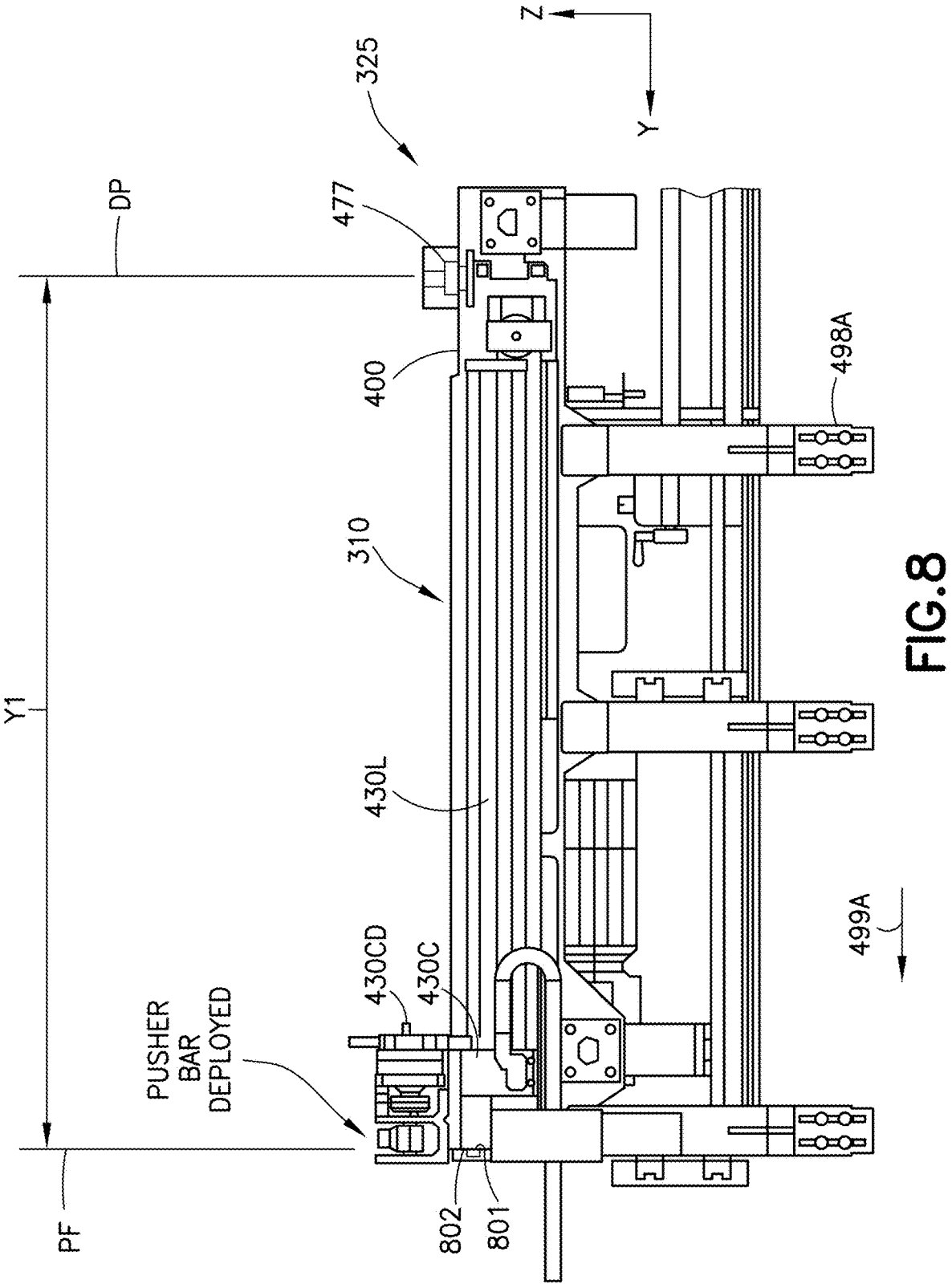
FIG. 8 is a schematic elevation view of a portion of the bottom slip sheet removal system of FIG. 3 in accordance with aspects of the disclosed embodiment.
Figure 9:
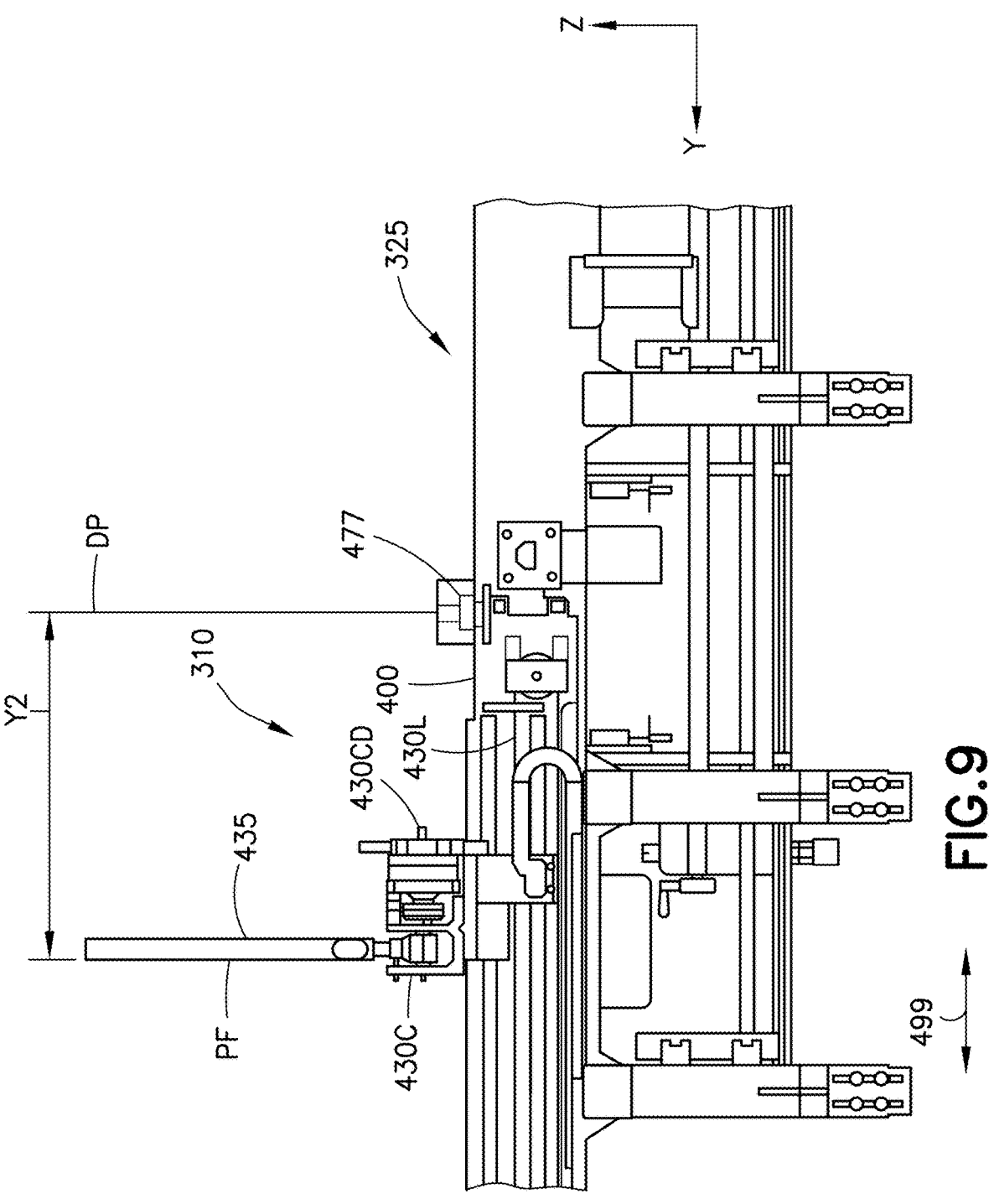
FIG. 9 is a schematic elevation view of a portion of the bottom slip sheet removal system of FIG. 3 in accordance with aspects of the disclosed embodiment.

Referring to FIGS. 1, 3, 4A, 4B, 5A, 5B, 5C, 15B, 16A, 16B, 17A, 17B, 18A, 18B, and 19 an exemplary operation of the slip sheet removal system 300 will be described in accordance with aspects of the disclosed embodiment. As described herein, the slip sheet removal system 300 is initialized so that the position Y1 of the push face PF of the at least one pusher bar 435 is known to the controller 333 (FIG. 8). The pusher bar 435 is moved, under command of the controller 333 and by actuator 430L) to the waiting position (e.g., distance Y2—FIG. 9). The layer place conveyor 320 is determined (e.g., by the presence sensor 477—see FIG. 6) to be free of obstructions and the robotic case manipulator(s) 14 of the palletizer cell 10 (e.g., that is communicably coupled to the slip sheet removal system 300) is operated to transfer a pallet layer PL to the layer place conveyor 320 so that the pallet layer PL is received by the slip sheet removal system 300 (FIG. 19, Block 1900).

Figure 19:
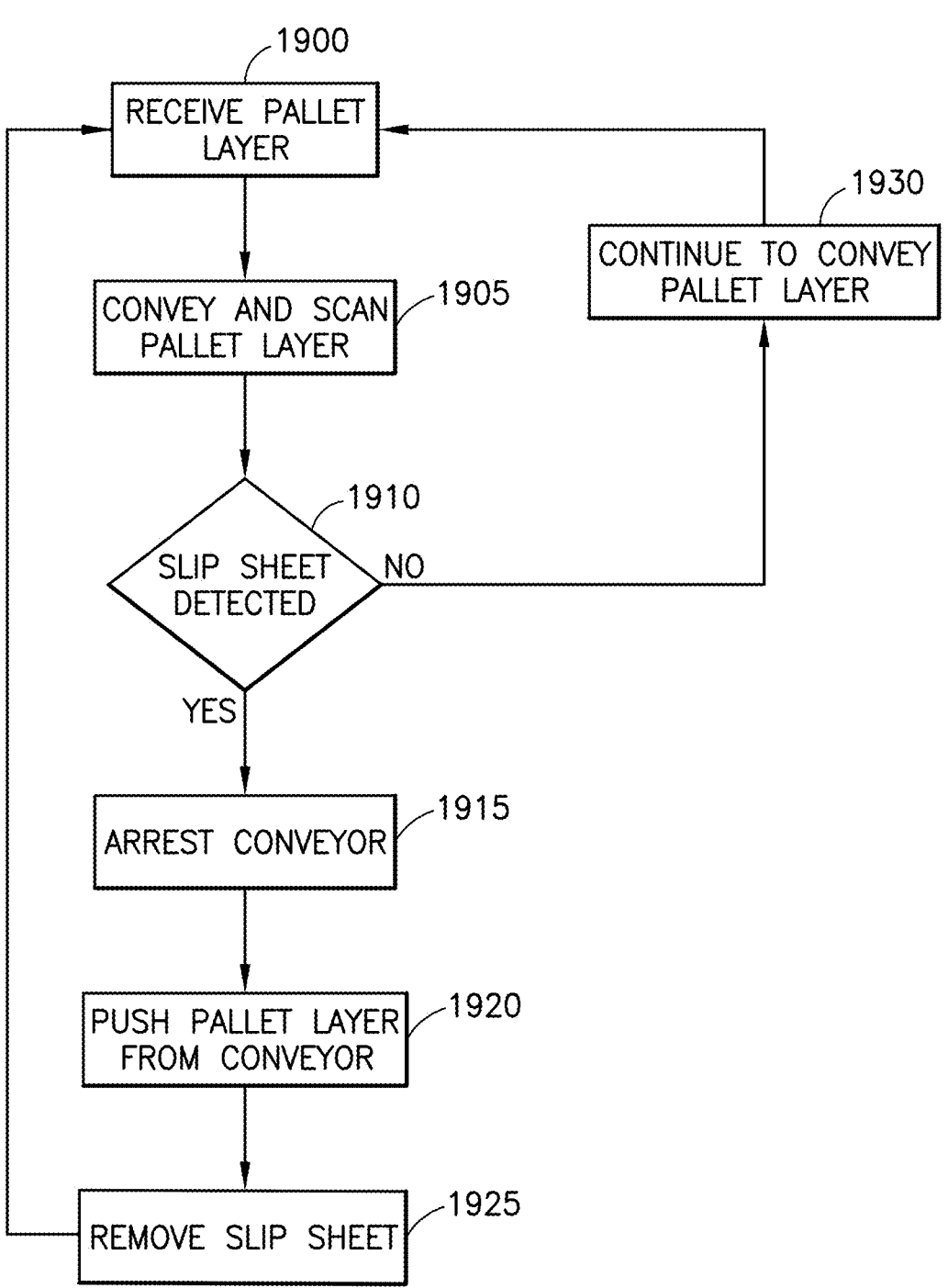
FIG. 19 is an exemplary flow diagram of a method for the bottom slip sheet removal system of FIG. 3 in accordance with aspects of the disclosed embodiment.

The pallet layer PL is conveyed in conveyance direction 499A along the layer place conveyor 320 and the accumulator conveyor 325 past and through the field of view FOVS of the scanner 1405 (FIG. 15A) so that the pallet layer PL is scanned by the scanner 1405 (FIG. 19, Block 1905). With a slip sheet 277 present underneath the pallet layer PL, the slip sheet 277 blocks the field of view for the duration of transit of the pallet layer PL past and through the field of view FOVS. As described herein without a slip sheet 277 located underneath the pallet layer PL and with the differential conveying speeds between the layer place conveyor 320 and the accumulator conveyor 325 the cases CU of the pallet layer are spaced apart by distance 1700 when they pass through the field of view FOVS of the scanner 1405 so that the cases CU intermittently block the field of view FOVS. The controller 333 is configured to detect the presence of a slip sheet 277 underneath the pallet layer PL based on whether the sensor signal from the scanner 1405 indicates a substantially steady/constant sensor value or substantially periodic or non-constant sensor value. The controller 333 may also be configured to detect the presence of a slip sheet 277 located on top of the pallet layer PL based on a magnitude of the substantially periodic or non-constant sensor value (e.g., the controller 333 is configured to discriminate picking of a slip sheet 277 disposed on top of the pallet layer PL or a slip sheet 277 disposed underneath of the pallet layer PL).

Figure 18A:
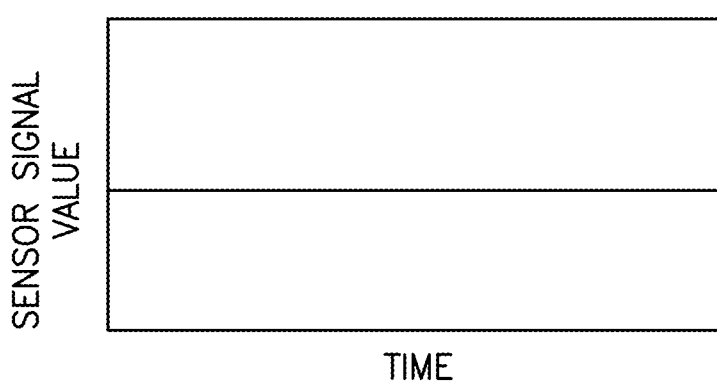
FIGS. 18A-18C are schematic plots of exemplary sensor signals of the bottom slip sheet removal system of FIG. 3 in accordance with aspects of the disclosed embodiment.
Figure 18B:
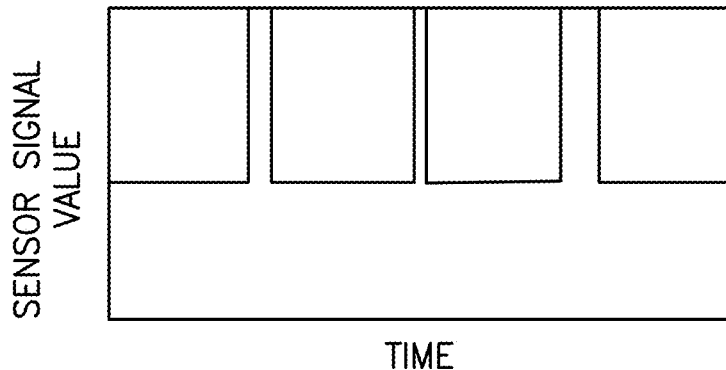
Figure 18C:
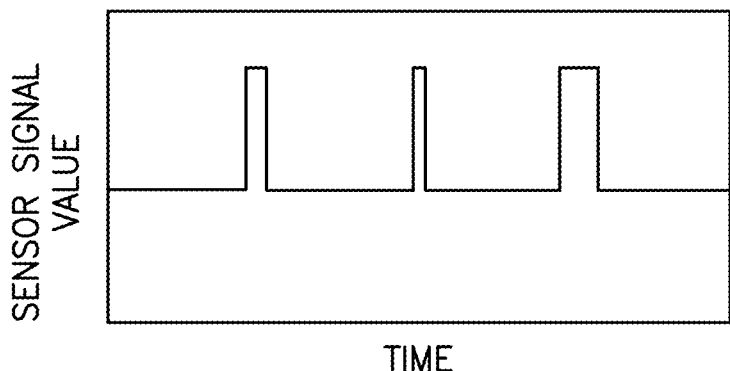

FIGS. 18A-18C illustrate sensor signals obtained with the scanner 1405 to effect, for exemplary purposes, a one-dimensional signal analysis for slip sheet 277 detection over time. Here, the scanner is for example the electromagnetic beam sensor described above. An exemplary sensor signal indicating a presence of a slip sheet 277 underneath the pallet layer PL is illustrated in FIG. 18A. An exemplary sensor signal indicating an absence of a slip sheet 277 is illustrated in FIG. 18B. An exemplary sensor signal indicating a presence of a slip sheet 277 on the top of the pallet layer PL is illustrated in FIG. 18C. FIG. 18A illustrates the sensor signal for the duration (e.g., time) of transit of the pallet layer PL past and through the field of view FOVS such that the slip sheet 277 blocks the field of view FOVS to produce a sensor signal having a substantially constant value. An exemplary sensor signal indicating an absence of a slip sheet 277 is illustrated in FIG. 18B. FIG. 18B also illustrates the sensor signal for the duration (e.g., time) of transit of the pallet layer PL past and through the field of view FOVS such that the cases CU intermittently block the field of view FOVS to produce a sensor signal having a case detection value and a null signal between cases. It is noted that with the field of view unblocked between the cases, the sensor signal increases to the null or infinite value to provide the intermittent sensor signal indicating the absence of a slip sheet 277. FIG. 18C illustrates the sensor signal for the duration (e.g., time) of transit of the pallet layer PL past and through the field of view FOVS such that the cases CU intermittently block the field of view FOVS to produce a sensor signal having a case detection value and a top slip sheet detected value between cases. Here, with the field of view blocked by the slip sheet 277 located on the top of the pallet layer PL, the sensor signal increases to a value corresponding with the top surface of the cases CU of the pallet layer PL to provide the intermittent sensor signal; however, as noted above the increase in magnitude of the sensor signal between the cases CU is limited so as to indicate the presence of a slip sheet on the top of the pallet layer PL. The slip sheet 277 may be removed from the top of the pallet layer PL in a manner substantially similar to that described herein; however, the at least one pusher arm need not push the pallet layer from the slip sheet, rather the slip sheet remover 350 may pick the slip sheet 277 substantially directly from the top of the pallet layer PL.

Figure 18D:
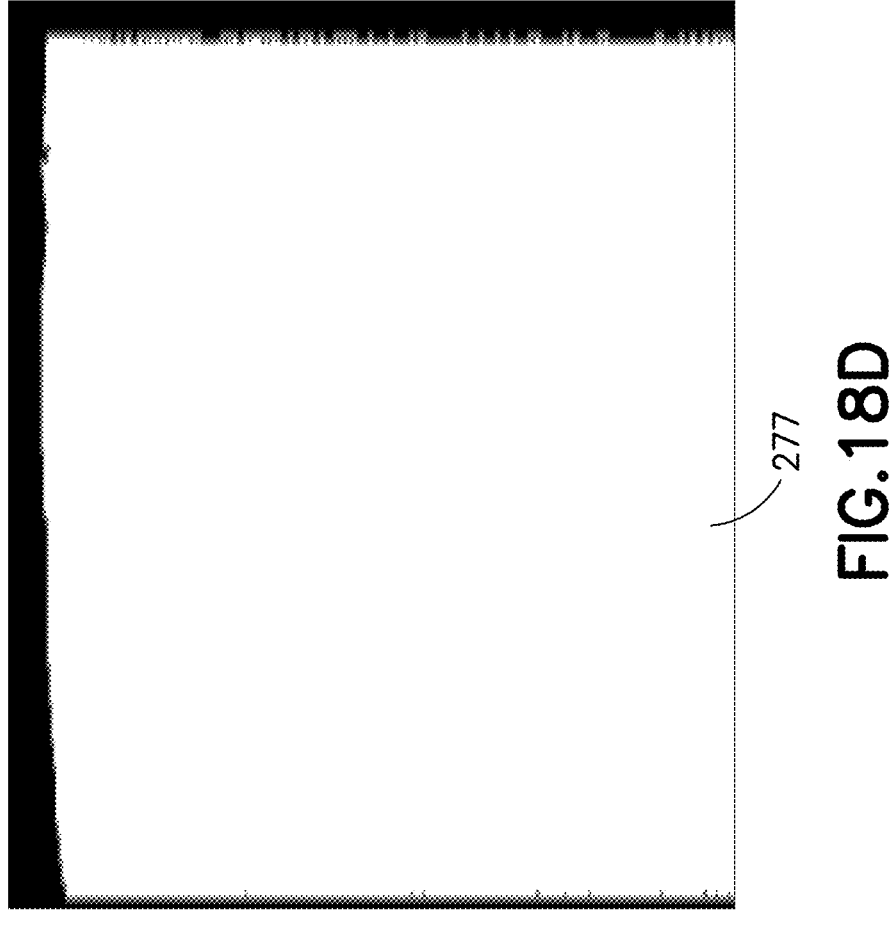
FIGS. 18D-18F are schematic plots of exemplary sensor signals of the bottom slip sheet removal system of FIG. 3 in accordance with aspects of the disclosed embodiment.
Figure 18E:
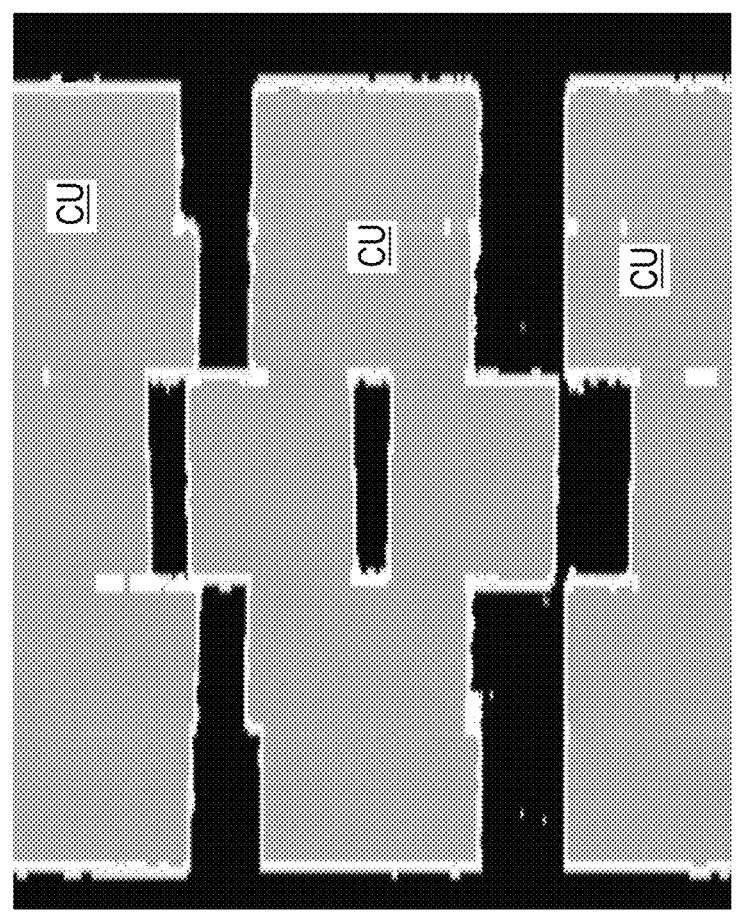
Figure 18F:
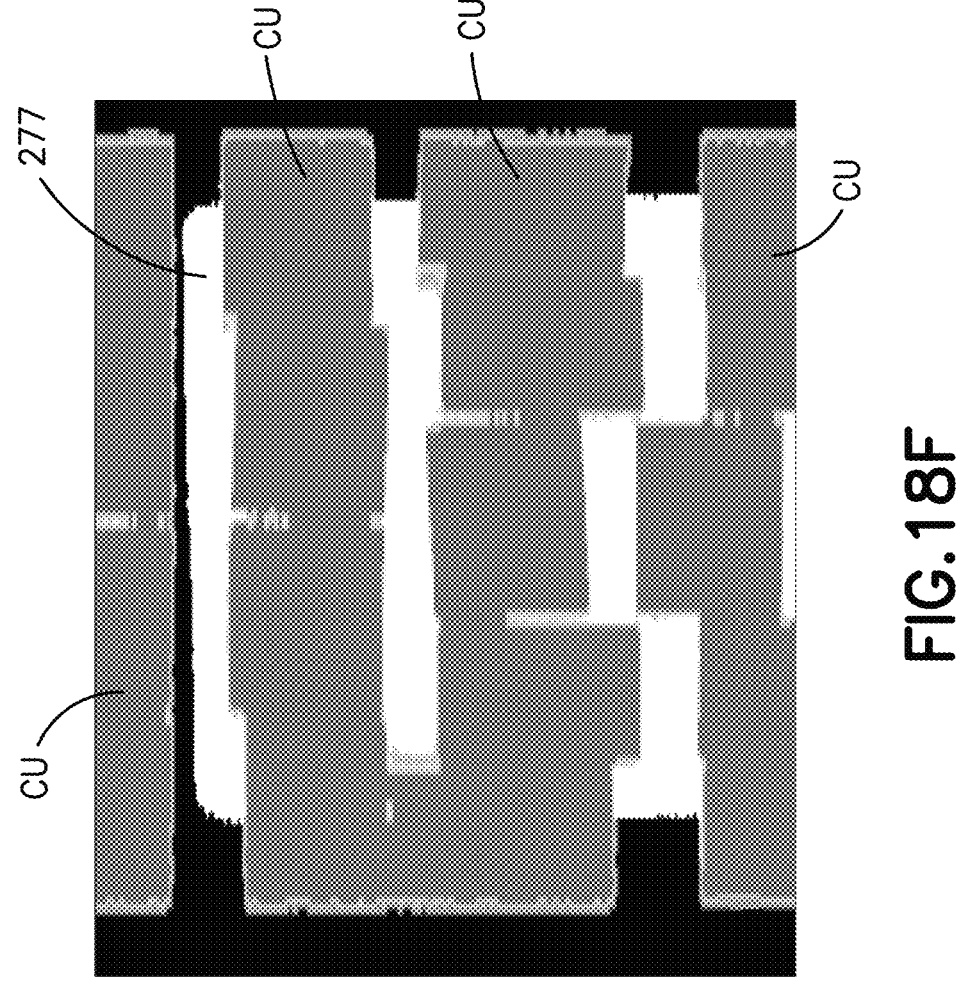

FIGS. 18D-18F illustrate sensor signals obtained with the scanner 1405 to effect, for exemplary purposes, at least a two-dimensional (e.g., depth map) signal analysis for slip sheet 277 detection over time. Here, the scanner is for example the imaging sensor (also referred to as a height sensor) described above. An exemplary depth map indicating a presence of a slip sheet 277 underneath the pallet layer PL of case units CU is illustrated in FIG. 18D. An exemplary depth map indicating an absence of a slip sheet 277 is illustrated in FIG. 18C. An exemplary depth map indicating a presence of a slip sheet 277 on the top of the case units CU of the pallet layer PL is illustrated in FIG. 18D. As described above, the slip sheet detection sensor 1400 includes the scanner 1405 (also referred to as a height sensor). Here, the slip sheet detection sensor also includes an encoder 1599 (also referred to as a distance sensor—see FIG. 15B). The scanner 1405 configured to measure a height between a surface of the seated destacked layer PL and a predetermined datum (such as the conveyance surface 401) and send height measure data embodying the height measure to the controller 333, and the encoder 1599 is configured to measure a distance (e.g., such as a conveyor tick distance) in which the scanner 1405 registers the height measure and send the controller 333 distance measure data embodying the distance measure. The controller 333 is configured to merge the height measure data and distance measure data forming a two-dimensional depth map characterizing the surface of the destacked layer PL seated on the accumulator conveyor 325, and the controller 333 determines presence of the slip sheet 277 and position contacting the at least one of the uppermost surface PLUS and bottom surface PLLS of the seated destacked layer PL. For example, as described above, the field of view FOVS of the scanner 1405 is substantially planar and can be considered as a single scan line with respect to a measured movement of the case units CU along the accumulator conveyor 325. Here, the value of each data point in the scan line is a distance between a surface (e.g., of the slip sheet 277 or of a case unit CU) and the scanner 1405. The accumulator conveyor 325 includes the encoder 1599 (also referred to herein as a distance sensor and with the scanner 1450 forms the slip sheet detection sensor 1400—see FIG. 15B) so that each scan line obtained by the scanner 1405 over the measured movement has displacement along the a reference position indicating its movement direction 499 of the accumulator conveyor 325. The encoder 1599 and scanner 1405 may be calibrated with respect to the accumulator conveyor 325 so that the accumulator conveyor's tick size (with respect to the number of ticks the encoder generates when the conveyor moves one meter or any other suitable distance measure) is known, the scale in the direction perpendicular to the conveyance surface 401 of the accumulator conveyor 325 is known, and a reference line representing the conveyance surface 401 is known, where these calibrated parameters are accessible by or stored in the controller 333. With the encoder 1599 and scanner 1405 calibrated, and knowing the displacement between scan lines and the distance between the scanner and the surfaces, the controller 333, via any suitable image processing algorithms, converts the scan lines from the scanner 1405 (e.g., with the case units CU moving in the conveyance traverse direction 499) into a two-dimensional depth map such that every pixel is of a known size in millimeters (or any other suitable unit of measure) effecting accurate measurements of the case units CU and slip sheets 277 conveyed on the accumulator conveyor 325. Here, every pixel's value in the depth map is the distance, perpendicular to the conveyance surface 401, between the detected object (e.g., slip sheet 277 or case unit CU) and the conveyance surface 401.

FIG. 18D illustrates the two dimensional depth map for a measured movement (e.g., distance) of transit of the pallet layer PL past and through the field of view FOVS such that the slip sheet 277 blocks the field of view FOVS to produce a two-dimensional depth map having a substantially constant value. An exemplary two-dimensional depth map indicating an absence of a slip sheet 277 is illustrated in FIG. 18E where the case units CU are illustrated and the spaces between the case units CU is substantially a null value. In FIG. 18E the two-dimensional depth map is illustrated for the measured movement of transit of the pallet layer PL past and through the field of view FOVS such that the cases CU intermittently block the field of view FOVS to produce the two-dimensional depth map having a case detection value and a null signal between cases. It is noted that with the field of view unblocked between the cases, the two-dimensional depth map pixel distance data increases to the null or infinite value indicating the absence of a slip sheet 277. FIG. 18F illustrates the two-dimensional depth map for the measured movement of transit of the pallet layer PL past and through the field of view FOVS such that the cases CU intermittently block the field of view FOVS to produce a two-dimensional depth map having a case detection value and a top slip sheet detected value between cases. Here, with the field of view blocked by the slip sheet 277 located on the top of the pallet layer PL, the distance value of the pixels between the cases CU increases to a value corresponding with the top surface of the cases CU of the pallet layer PL; however, as noted above the distance value of the pixels, in the two-dimensional depth map, between the cases CU is limited so as to indicate the presence of a slip sheet 277 on the top of the pallet layer PL. The slip sheet 277 may be removed from the top of the pallet layer PL in a manner substantially similar to that described herein; however, the at least one pusher arm need not push the pallet layer from the slip sheet, rather the slip sheet remover 350 may pick the slip sheet 277 substantially directly from the top of the pallet layer PL.

The controller 333 is configured to identify/detect a presence of a (bottom) slip sheet 277 based on the substantially constant sensor value (see FIG. 18A) during transit of the pallet layer PL past the and through the field of view FOVS. The controller 333 is also configured to identify/detect an absence of a slip sheet 277 and/or a presence of a (top) slip sheet 277 based on the intermittent sensor value (see FIGS. 18B and 18C) during transit of the pallet layer PL past the and through the field of view FOVS.

In other aspects, another scanner (similar to scanner 1405 may be provided above the conveyor portion 400 so as to determine a presence of a top slip sheet 277 while the scanner 1405 determines the presence of the bottom slip sheet. Here, if both a top and bottom slip sheet 277 are present the slip sheet remover 350 may remove the top slip sheet in the manner noted above, the at least one pusher arm may push the pallet layer off the bottom slip sheet 277, and the slip sheet remover 350 may then remove the bottom slip sheet 277 in the manner described herein.

With the absence of the slip sheet 277, conveyance of the cases CU of the pallet layer PL in the conveyance direction 499A is uninterrupted and the cases are conveyed by the slip sheet removal system 300 without stoppage/interruption (FIG. 19, Block 1930). With the presence of a slip sheet 277 the pallet layer PL is conveyed in direction 499A to the end of the conveyor portion 400 (as described herein) of the bottom slip sheet remover 310 and the conveyor portion 400 movement is arrested (e.g., stopped) (FIG. 19, Block 1915). The lock 401L is actuated to hold the conveyance surface 401 of the conveyor portion 400 substantially stationary relative to the conveyance direction 499. As described above, the conveyance surface 401 has a substantially uniform (e.g., common or steady state) coefficient of friction. The substantially uniform (e.g., common or steady state) coefficient of friction of the conveyance surface 401 (e.g., such as of the continuous/solid rubber top (endless) belt 401R, the perforated rubber top (endless) belt 401P, and the more than one rubber top (endless) belt 401C-see FIGS. 5A-5C) is configured to both provide sufficient friction to convey the pallet layer in the conveyance direction 499 and to grip the slip sheet 277 and hold the slip sheet substantially stationary relative to the conveyance direction with the movement of the conveyor surface 401 held substantially stationary by the lock 401L.

In some aspects (see FIGS. 5B and 5C) suction gripping of the slip sheet 277 may also be provided in addition to the substantially uniform (e.g., common or steady state) coefficient of friction. For example, in the aspect illustrated in FIG. 5B the bottom slip sheet remover 310 may include any suitable vacuum source 555 in communication with the perforations of the perforated rubber top (endless) belt 401P. The vacuum source 555 is actuated, with the pallet layer disposed at the end of the conveyor portion 400 and with the movement of the conveyance surface 401 in the conveyance direction 499A arrested, so that the vacuum source 555 provides suction through the perorations that hold the slip sheet 277 stationary on the conveyance surface 401. In the aspect illustrated in FIG. 5C, the bottom slip sheet remover 310 may include the vacuum source 555 and deployable suction cups 577. The deployable suction cups are disposed below a plane defined by the conveyance surface 401 with conveyance of the pallet layer PL by the conveyor portion 400. With the movement of the conveyance surface 401 arrested and the pallet layer PL disposed at the end of the conveyor portion 400 (as described herein) the suction cups 577 are raised in/along the Z direction/axis to or above the plane defined by the conveyance surface 401 so that the suction cups 577 grip the slip sheet 277 held on the conveyance surface 401.

Figure 10:
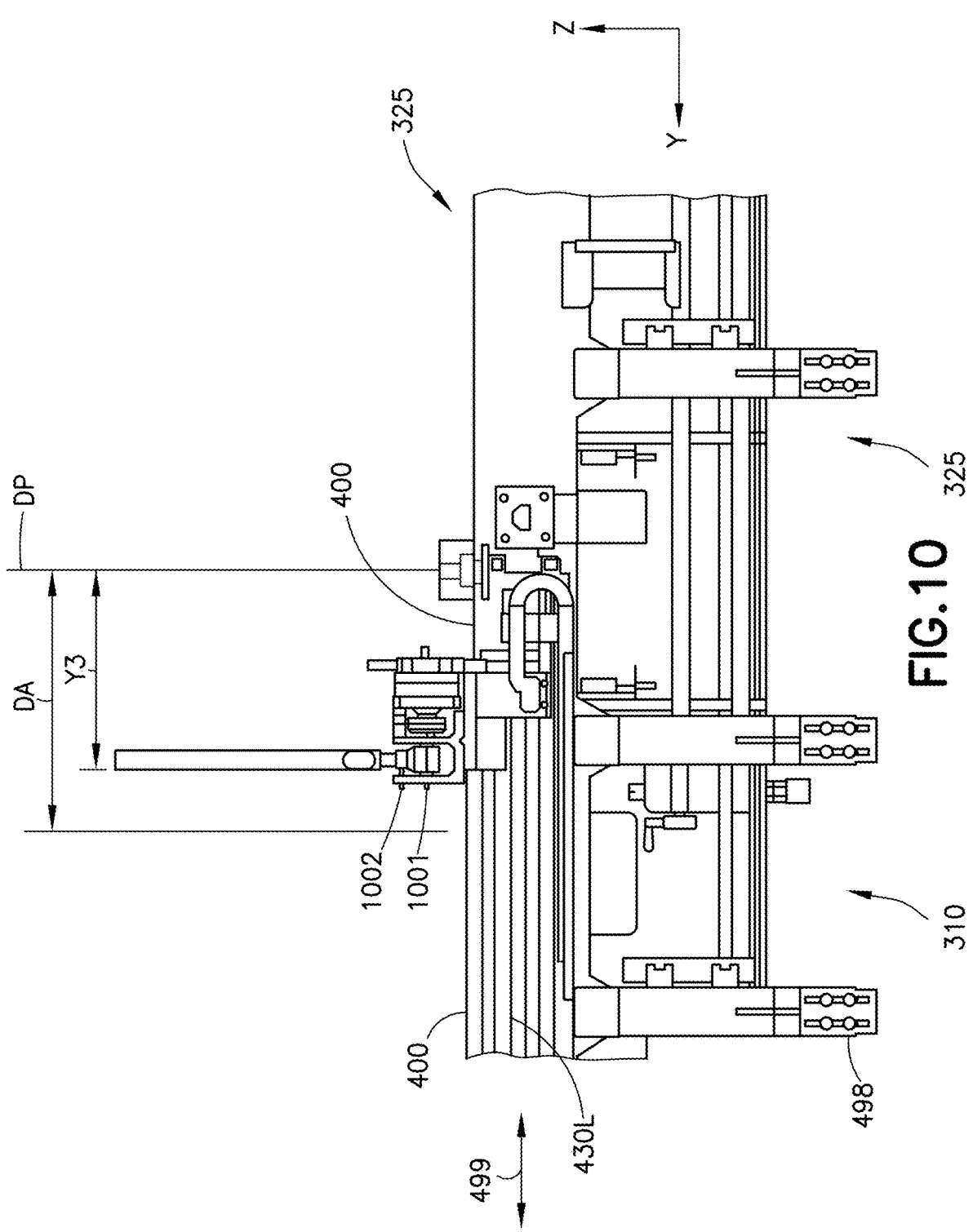
FIG. 10 is a schematic elevation view of a portion of the bottom slip sheet removal system of FIG. 3 in accordance with aspects of the disclosed embodiment.
Figure 11:
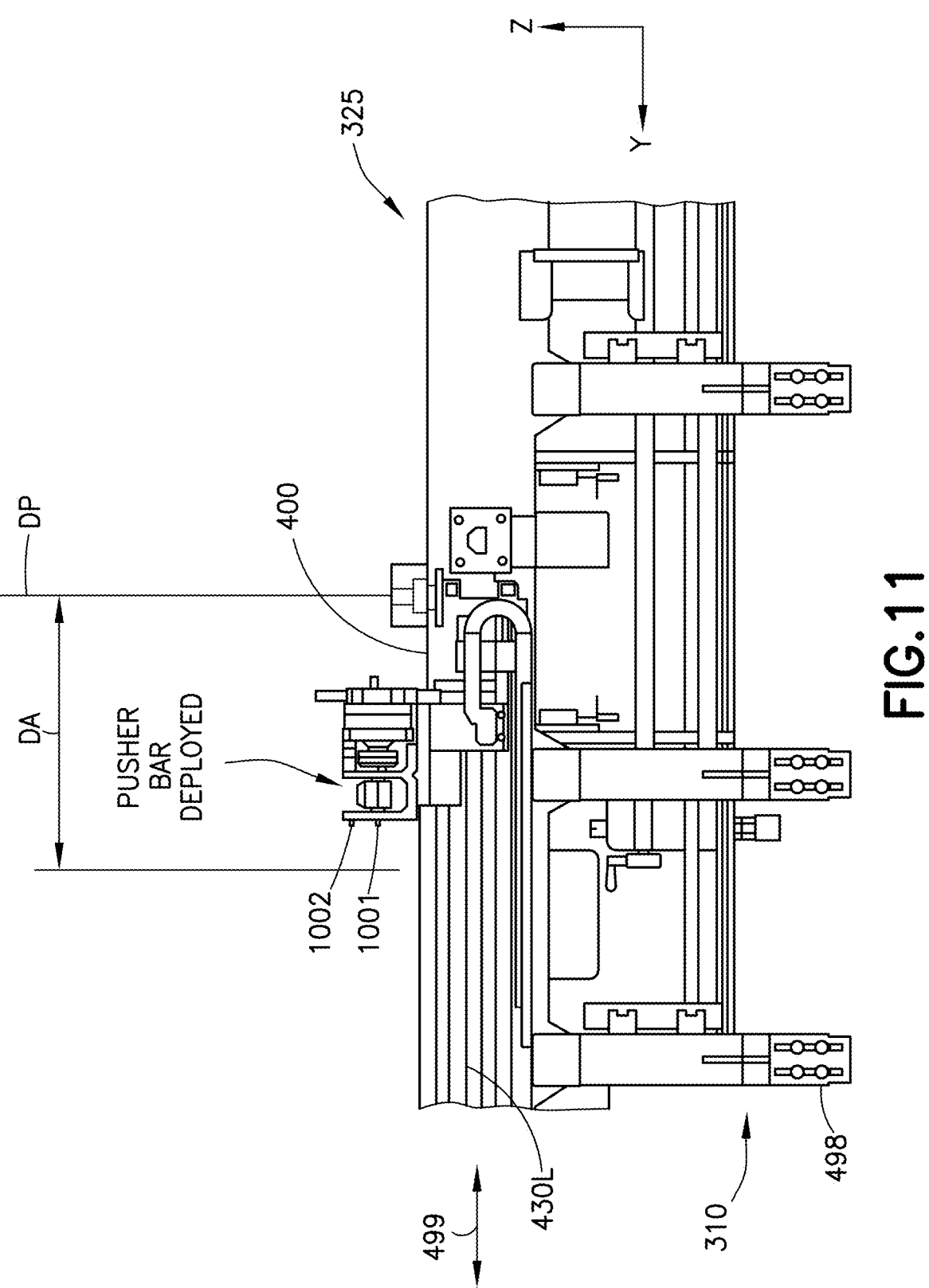
FIG. 11 is a schematic elevation view of a portion of the bottom slip sheet removal system of FIG. 3 in accordance with aspects of the disclosed embodiment.
Figure 12:
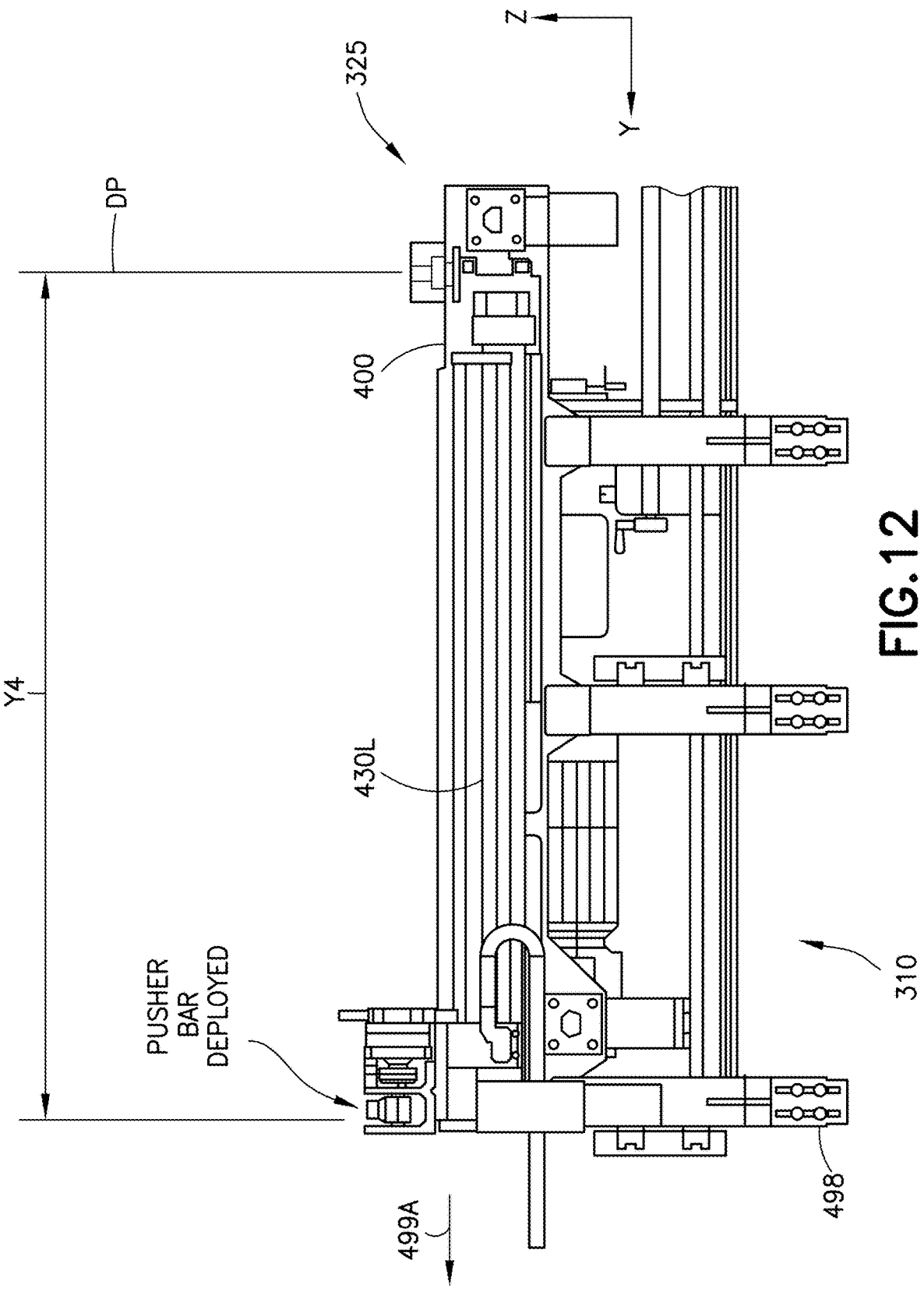
FIG. 12 is a schematic elevation view of a portion of the bottom slip sheet removal system of FIG. 3 in accordance with aspects of the disclosed embodiment.

As described herein, the push face PF of the at least one pusher bar 435 is moved from the waiting position (e.g., distance Y2—FIG. 9) to the ready to lower position (e.g., distance Y3—FIG. 10). The presence sensor 476 (FIG. 7) determines (with the controller 333) that the area DA is free from obstructions and the at least one pusher arm 435 is pivoted to the deployed position to place the at least one pusher arm 435 in the ready to push position (FIG. 11). The at least one pusher bar 435 is moved in the conveyance direction 499A so as to contact the pallet layer PL and push the pallet layer in the conveyance direction 499A with the slip sheet 277 being held substantially stationary relative to the conveyance direction 499A by at least the conveyance surface 401 so as to strip the pallet layer PL off of the slip sheet 277. The at least one pusher bar 435 pushes the pallet layer PL from the conveyor portion 400 (FIG. 19, Block 1920) and substantially onto the spreader conveyor 330 (for conveyance from the slip sheet removal system 300) so that the cases CU of the pallet layer are pushed off of the slip sheet 277 and the slip sheet 277 is fully exposed.

The controller 333 commands the slip sheet remover 350 to move the slip sheet gripper 351 to the slip sheet. The slip sheet gripper 351 grips the slip sheet 277 and removes the slip sheet 277 from the conveyor portion 400 (FIG. 19, Block 1925). The slip sheet remover 350 moves the slip sheet gripper 351 and the slip sheet 277 held thereby to the slip sheet receptacle 1666. The slip sheet gripper 351 releases the slip sheet 277 for placement of the slip sheet into the slip sheet receptacle 1666. With the slip sheet 277 removed the at least one pusher arm 435 is moved to the waiting position and the lock 401L for conveyor portion 400 is released. The conveyor portion 400 is actuated to convey a next pallet layer received by the slip sheet removal system 300 in the conveyance direction 499A and the slip sheet removal system 300 (e.g., controller 333) sends a signal to the palletizer cell 10 for placement of the next/another pallet layer PL.

Referring to FIGS. 3, 4A, and 4B the movement of the at least one pusher bar 435 is monitored by the controller 333 to determine whether the at least one pusher bar 435 is pushing the pallet layer over the surface of a slip sheet 277 or over the conveyance surface 401 of the bottom slip sheet remover 310. The controller 333 is configured to monitor the movement of the at least one pusher bar by determining a force applied by the respective actuator 430L of the at least one pusher arm 435. For example, based on a weight of the pallet layer PL (as determined by the palletizer cell 10 or informed by the controller 199C according to a pallet load plan) and packaging type, the amount of torque/force the actuator 430L should apply (i.e., a predetermined/expected force) to move the pallet layer over the surface of the slip sheet 277 is determined by the controller 333. If the amount of torque/force applied by the actuator 430L exceeds the predetermined force by a predetermined amount (e.g., tolerance) the at least one pusher arm 435 may be pushing the pallet load over the conveyance surface 401 (rather than over the surface of the slip sheet) and/or the case(s) of the pallet layer may be stuck to the slip sheet where the at least one pusher arm 435 is pushing both the pallet layer PL and the slip sheet 277 over the conveyance surface 401. Here the controller 333 includes a table that informs of the friction coefficient for each type of packaging (e.g., regular corrugated cardboard, shrink wrap, shiny printed cardboard, etc.) handled by the slip sheet removal system 300. With the friction coefficient of the different types of packaging known the controller 333 is configured to determine the predetermined torque/force using, for example, the following equation:

$$EF(Nm) = \frac{LW(\text{kg}) \times G\left(\frac{\text{m}}{\text{s}^2}\right) \times Fc \times 0.045845(\text{m})}{50}$$

where units are provided in brackets and EF is the predetermined/expected force in Nm, LW is the pallet layer weight in Kg, G is the acceleration due to gravity (e.g., 9.81 m/s²) and Fc is the friction coefficient of the packaging. Where the controller 333 determines an actual force of the actuator 430L exceeds the predetermined force by the predetermined amount (tolerance) the controller 333 effects notification (e.g., aural, visual, etc.) to an operator and stops motion of the actuator 430L. The operator may, through a user interface 333U of the controller 333, effect manual retraction of the at least one pusher bar 435 and conveyance of the pallet layer PL (with or without slip sheet presence) by the conveyor portion 400 through and past the slip sheet removal system 300. The operator may also, through the user interface 333U, command continued operation of the at least one pusher bar 435, such as where the actual force exerted by the actuator 430L is within actuator operational limits, so that the at least one pusher bar 435 pushes the pallet layer to the spreader conveyor 330.

Figure 20:
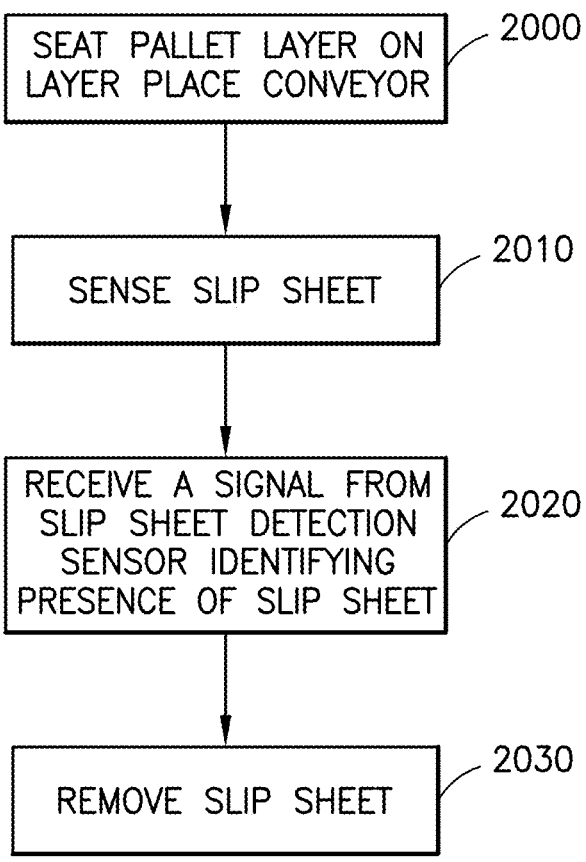
FIG. 20 is an exemplary flow diagram of a method in accordance with aspects of the disclosed embodiment.

Referring to FIGS. 1, 3, 4A, 4B, 5A, 5B, 5C, 15B, 16A, 16B, 17A, 17B, 18A, 18B, and 20, a method for destacking a pallet layer PL, from a stacked layer pallet load PAL, with the layer destacking system LDS described herein will be described. The method includes seating the destacked pallet layer PL on a layer place conveyor 320 (FIG. 20, Block 2000). As described herein, the layer place conveyor 320 has a conveying surface 321CS with a conveyance traverse direction 499 that traverses (e.g., moves) the seated pallet layer PL off the layer place conveyor 320. The slip sheet detection sensor (such as slip sheet detector 1400) that is coupled to the layer place conveyor 320 senses a slip sheet 277 (FIG. 20, Block 2010) in contact with the seated destacked pallet layer PL on at least one of the uppermost surface PLUS and the bottom surface PLLS of the seated destacked pallet layer PL, in the manner described herein. The controller 333 receives a signal from the slip sheet detection sensor identifying presence of the slip sheet 277 (FIG. 20, Block 2020). The controller 333 determines from the received signal the slip sheet 277 contacting the at least one of the uppermost surface PLUS and the bottom surface PLLS of the seated destacked pallet layer PL. The slip sheet remover 310 engages, above the layer place conveyor 320 and with the slip sheet remover 310 extending at least in part over the layer place conveyor, the slip sheet 277 contacting the at least one of the uppermost surface PLUS and the bottom surface PLLS of the seated destacked pallet layer PL to remove the slip sheet 277 from the accumulator conveyor 325 (FIG. 20, Block 2030) in the manner described herein. Here, as described herein, the controller 333 is operably connected to the slip sheet remover 310 so as to actuate the slip sheet remover 310 engaging the slip sheet 277 contacting the at least one of the uppermost surface PLUS and the bottom surface PLLS, and lifting the slip sheet 277 effecting discharge of the slip sheet 277 off the accumulator conveyor 325.

In accordance with one or more aspects of the disclosed embodiment a layer destacking system for destacking a layer from a stacked layer pallet load, the layer destacking system includes a layer seating platform configured so as to seat the destacked layer on the layer seating platform, and having a conveying surface with a conveyance traverse direction that traverses the seated destacked layer off the layer seating platform; a slip sheet detection sensor coupled to the layer seating platform and arranged to sense a slip sheet in contact with the seated destacked layer on at least one of an uppermost surface and a bottom surface of the seated destacked layer; a slip sheet pickup removal mechanism extending at least in part over the layer seating platform and configured so as to engage, above the layer seating platform, the slip sheet contacting the at least one of the uppermost surface and the bottom surface of the seated destacked layer; and a controller communicably coupled to the slip sheet detection sensor so as to receive a signal from the slip sheet detection sensor identifying presence of the slip sheet, the controller is configured to determine from the received signal the slip sheet contacting the at least one of the uppermost surface and the bottom surface of the seated destacked layer; wherein the controller is operably connected to the slip sheet pickup removal mechanism so as to actuate the slip sheet pickup removal mechanism engaging the slip sheet contacting the at least one of the uppermost surface and the bottom surface, and lifting the slip sheet effecting discharge of the slip sheet off the layer seating platform.

In accordance with one or more aspects of the disclosed embodiment the slip sheet pickup removal mechanism is a gantry above the layer seating platform.

In accordance with one or more aspects of the disclosed embodiment the slip sheet pickup removal mechanism has a pick head that engages an upper surface of the slip sheet.

In accordance with one or more aspects of the disclosed embodiment the slip sheet detection sensor is disposed to sense the slip sheet on the at least one of the uppermost surface and the bottom surface of the seated destacked layer.

In accordance with one or more aspects of the disclosed embodiment the slip sheet detection sensor is disposed to sense the slip sheet on the at least one of the uppermost surface and the bottom surface of the seated destacked layer with the destacked layer seated on the conveying surface.

In accordance with one or more aspects of the disclosed embodiment the slip sheet detection sensor is an electromagnetic beam sensor arranged so as to emit a sensing beam in a direction that crosses a seating plane of the conveying surface so as to sense the slip sheet on the at least one of the uppermost surface and the bottom surface of the seated destacked layer.

In accordance with one or more aspects of the disclosed embodiment the slip sheet detection sensor is an imaging sensor registering the slip sheet on the at least one of the uppermost surface and the bottom surface of the seated destacked layer in a direction crossing a seating plane of the seated destacked layer seated on the conveying surface.

In accordance with one or more aspects of the disclosed embodiment the layer destacking system further includes a displacer movably coupled to the layer seating platform and actuable in a direction aligned with the conveyance traverse direction between an advanced position and a retracted position that displaces the seated destacked layer and the slip sheet on the bottom surface relative to each other stripping the seated destacked layer and slip sheet from each other.

In accordance with one or more aspects of the disclosed embodiment the displacer is actuable to raise and lower to and from engaged and disengaged positions.

In accordance with one or more aspects of the disclosed embodiment retraction of the displacer and slip sheet pick up for discharge with the slip sheet pickup removal mechanism are decoupled from each other.

In accordance with one or more aspects of the disclosed embodiment retraction of the displacer and slip sheet pick up for discharge with the slip sheet pickup removal mechanism are substantially coincident, at least in part.

In accordance with one or more aspects of the disclosed embodiment a layer destacking system for destacking a layer from a stacked layer pallet load, the layer destacking system includes a layer seating platform configured so as to seat the destacked layer on the layer seating platform, and having a conveying surface with a conveyance traverse direction that traverses the seated destacked layer off the layer seating platform; a slip sheet detection sensor coupled to the layer seating platform and arranged to sense a slip sheet in contact with the seated destacked layer on at least one of an uppermost surface and a bottom surface of the seated destacked layer; a slip sheet pickup removal mechanism extending at least in part over the layer seating platform and configured so as to engage, above the layer seating platform, the slip sheet contacting the at least one of the uppermost surface and the bottom surface of the seated destacked layer; and a controller communicably coupled to the slip sheet detection sensor so as to receive a signal from the slip sheet detection sensor identifying presence of the slip sheet; wherein the controller is operably connected to the slip sheet pickup removal mechanism so as to actuate the slip sheet pickup removal mechanism engaging the slip sheet contacting the at least one of the uppermost surface and the bottom surface, and lifting the slip sheet effecting discharge of the slip sheet off the layer seating platform based on the signal.

In accordance with one or more aspects of the disclosed embodiment the controller is configured to determine, from the signal, the slip sheet contacting the at least one of the uppermost surface and the bottom surface of the seated destacked layer.

In accordance with one or more aspects of the disclosed embodiment the slip sheet pickup removal mechanism is a gantry above the layer seating platform.

In accordance with one or more aspects of the disclosed embodiment the slip sheet pickup removal mechanism has a pick head that engages an upper surface of the slip sheet.

In accordance with one or more aspects of the disclosed embodiment the slip sheet detection sensor is disposed to sense the slip sheet on the at least one of the uppermost surface and the bottom surface of the seated destacked layer.

In accordance with one or more aspects of the disclosed embodiment the slip sheet detection sensor is disposed to sense the slip sheet on the at least one of the uppermost surface and the bottom surface of the seated destacked layer with the destacked layer seated on the conveying surface.

In accordance with one or more aspects of the disclosed embodiment the slip sheet detection sensor is an electromagnetic beam sensor arranged so as to emit a sensing beam in a direction that crosses a seating plane of the conveying surface so as to sense the slip sheet on the at least one of the uppermost surface and the bottom surface of the seated destacked layer.

In accordance with one or more aspects of the disclosed embodiment the slip sheet detection sensor is an imaging sensor registering the slip sheet on the at least one of the uppermost surface and the bottom surface of the seated destacked layer in a direction crossing a seating plane of the seated destacked layer seated on the conveying surface.

In accordance with one or more aspects of the disclosed embodiment the layer destacking system further includes a displacer movably coupled to the layer seating platform and actuable in a direction aligned with the conveyance traverse direction between an advanced position and a retracted position that displaces the seated destacked layer and the slip sheet on the bottom surface relative to each other stripping the seated destacked layer and slip sheet from each other.

In accordance with one or more aspects of the disclosed embodiment the displacer is actuable to raise and lower to and from engaged and disengaged positions.

In accordance with one or more aspects of the disclosed embodiment retraction of the displacer and slip sheet pick up for discharge with the slip sheet pickup removal mechanism are decoupled from each other.

In accordance with one or more aspects of the disclosed embodiment retraction of the displacer and slip sheet pick up for discharge with the slip sheet pickup removal mechanism are substantially coincident, at least in part.

In accordance with one or more aspects of the disclosed embodiment a method for destacking a layer, from a stacked layer pallet load, with a layer destacking system, is provided. The method includes seating the destacked layer on a layer seating platform, where the layer seating platform has a conveying surface with a conveyance traverse direction that traverses the seated destacked layer off the layer seating platform; sensing, with a slip sheet detection sensor coupled to the layer seating platform, a slip sheet in contact with the seated destacked layer on at least one of an uppermost surface and a bottom surface of the seated destacked layer; engaging, above the layer seating platform and with a slip sheet pickup removal mechanism extending at least in part over the layer seating platform, the slip sheet contacting the at least one of the uppermost surface and the bottom surface of the seated destacked layer; and receiving, with a controller communicably coupled to the slip sheet detection sensor, a signal from the slip sheet detection sensor identifying presence of the slip sheet, where the controller determines from the received signal the slip sheet contacting the at least one of the uppermost surface and the bottom surface of the seated destacked layer; wherein the controller is operably connected to the slip sheet pickup removal mechanism so as to actuate the slip sheet pickup removal mechanism engaging the slip sheet contacting the at least one of the uppermost surface and the bottom surface, and lifting the slip sheet effecting discharge of the slip sheet off the layer seating platform.

In accordance with one or more aspects of the disclosed embodiment the slip sheet pickup removal mechanism is a gantry above the layer seating platform.

In accordance with one or more aspects of the disclosed embodiment the slip sheet pickup removal mechanism has a pick head that engages an upper surface of the slip sheet.

In accordance with one or more aspects of the disclosed embodiment the slip sheet detection sensor is disposed to sense the slip sheet on the at least one of the uppermost surface and the bottom surface of the seated destacked layer.

In accordance with one or more aspects of the disclosed embodiment the slip sheet detection sensor is disposed to sense the slip sheet on the at least one of the uppermost surface and the bottom surface of the seated destacked layer with the destacked layer seated on the conveying surface.

In accordance with one or more aspects of the disclosed embodiment the slip sheet detection sensor is an electromagnetic beam sensor arranged so as to emit a sensing beam in a direction that crosses a seating plane of the conveying surface so as to sense the slip sheet on the at least one of the uppermost surface and the bottom surface of the seated destacked layer.

In accordance with one or more aspects of the disclosed embodiment the slip sheet detection sensor is an imaging sensor registering the slip sheet on the at least one of the uppermost surface and the bottom surface of the seated destacked layer in a direction crossing a seating plane of the seated destacked layer seated on the conveying surface.

In accordance with one or more aspects of the disclosed embodiment the method further includes actuating a displacer, that is movably coupled to the layer seating platform, in a direction aligned with the conveyance traverse direction between an advanced position and a retracted position that displaces the seated destacked layer and the slip sheet on the bottom surface relative to each other stripping the seated destacked layer and slip sheet from each other.

In accordance with one or more aspects of the disclosed embodiment the displacer is actuable to raise and lower to and from engaged and disengaged positions.

In accordance with one or more aspects of the disclosed embodiment retraction of the displacer and slip sheet pick up for discharge with the slip sheet pickup removal mechanism are decoupled from each other.

In accordance with one or more aspects of the disclosed embodiment retraction of the displacer and slip sheet pick up for discharge with the slip sheet pickup removal mechanism are substantially coincident, at least in part.

In accordance with one or more aspects of the disclosed embodiment a method for destacking a layer, from a stacked layer pallet load, with a layer destacking system, is provided. The method includes seating the destacked layer on a layer seating platform, where the layer seating platform has a conveying surface with a conveyance traverse direction that traverses the seated destacked layer off the layer seating platform; sensing, with a slip sheet detection sensor coupled to the layer seating platform, a slip sheet in contact with the seated destacked layer on at least one of an uppermost surface and a bottom surface of the seated destacked layer; engaging, above the layer seating platform and with a slip sheet pickup removal mechanism extending at least in part over the layer seating platform, the slip sheet contacting the at least one of the uppermost surface and the bottom surface of the seated destacked layer; and receiving, with a controller communicably coupled to the slip sheet detection sensor, a signal from the slip sheet detection sensor identifying presence of the slip sheet; wherein the controller is operably connected to the slip sheet pickup removal mechanism so as to actuate the slip sheet pickup removal mechanism engaging the slip sheet contacting the at least one of the uppermost surface and the bottom surface, and lifting the slip sheet effecting discharge of the slip sheet off the layer seating platform based on the signal.

In accordance with one or more aspects of the disclosed embodiment the controller is configured to determine, from the signal, the slip sheet contacting the at least one of the uppermost surface and the bottom surface of the seated destacked layer.

In accordance with one or more aspects of the disclosed embodiment the slip sheet pickup removal mechanism is a gantry above the layer seating platform.

In accordance with one or more aspects of the disclosed embodiment the slip sheet pickup removal mechanism has a pick head that engages an upper surface of the slip sheet.

In accordance with one or more aspects of the disclosed embodiment the slip sheet detection sensor is disposed to sense the slip sheet on the at least one of the uppermost surface and the bottom surface of the seated destacked layer.

In accordance with one or more aspects of the disclosed embodiment the slip sheet detection sensor is disposed to sense the slip sheet on the at least one of the uppermost surface and the bottom surface of the seated destacked layer with the destacked layer seated on the conveying surface.

In accordance with one or more aspects of the disclosed embodiment the slip sheet detection sensor is an electromagnetic beam sensor arranged so as to emit a sensing beam in a direction that crosses a seating plane of the conveying surface so as to sense the slip sheet on the at least one of the uppermost surface and the bottom surface of the seated destacked layer.

In accordance with one or more aspects of the disclosed embodiment the slip sheet detection sensor is an imaging sensor registering the slip sheet on the at least one of the uppermost surface and the bottom surface of the seated destacked layer in a direction crossing a seating plane of the seated destacked layer seated on the conveying surface.

In accordance with one or more aspects of the disclosed embodiment the method further includes actuating a displacer, that is movably coupled to the layer seating platform, in a direction aligned with the conveyance traverse direction between an advanced position and a retracted position that displaces the seated destacked layer and the slip sheet on the bottom surface relative to each other stripping the seated destacked layer and slip sheet from each other.

In accordance with one or more aspects of the disclosed embodiment the displacer is actuable to raise and lower to and from engaged and disengaged positions.

In accordance with one or more aspects of the disclosed embodiment retraction of the displacer and slip sheet pick up for discharge with the slip sheet pickup removal mechanism are decoupled from each other.

In accordance with one or more aspects of the disclosed embodiment retraction of the displacer and slip sheet pick up for discharge with the slip sheet pickup removal mechanism are substantially coincident, at least in part.

In accordance with one or more aspects of the disclosed embodiment a layer destacking system for destacking a layer from a stacked layer pallet load is provided. The layer destacking system includes: a layer seating platform configured so as to seat the destacked layer on the layer seating platform, and having a conveying surface with a conveyance traverse direction that traverses the seated destacked layer off the layer seating platform; a slip sheet detection sensor coupled to the layer seating platform and arranged to sense a slip sheet in contact with the seated destacked layer on at least one of an uppermost surface and a bottom surface of the seated destacked layer; a slip sheet pickup removal mechanism extending at least in part over the layer seating platform and configured so as to engage, above the layer seating platform, the slip sheet contacting the at least one of the uppermost surface and the bottom surface of the seated destacked layer; and a controller communicably coupled to the slip sheet detection sensor; wherein the slip sheet detection sensor includes a height sensor configured to measure a height between a surface of the seated destacked layer and a predetermined datum and send height measure data embodying the height measure to the controller, and the slip sheet detection sensor includes a distance sensor configured to measure a distance in which the height sensor registers the height measure and send the controller distance measure data embodying the distance measure; and wherein the controller is configured to merge the height measure data and distance measure data forming a 2D depth map characterizing the surface, and the controller determines presence of the slip sheet and position contacting the at least one of the uppermost surface and bottom surface of the seated destacked layer.

In accordance with one or more aspects of the disclosed embodiment, the distance sensor is configured to measure the distance in the conveyance traverse direction.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the disclosed embodiment.

What is claimed is:

1. A layer destacking system for destacking a layer from a stacked layer pallet load, the layer destacking system comprising:

a layer seating platform configured so as to seat the destacked layer on the layer seating platform, and having a conveying surface with a conveyance traverse direction that traverses the seated destacked layer off the layer seating platform;

a slip sheet detection sensor coupled to the layer seating platform and arranged to sense a slip sheet in contact with the seated destacked layer on at least one of an uppermost surface and a bottom surface of the seated destacked layer;

a slip sheet pickup removal mechanism extending at least in part over the layer seating platform and configured so as to engage, above the layer seating platform, the slip sheet contacting the at least one of the uppermost surface and the bottom surface of the seated destacked layer; and a controller communicably coupled to the slip sheet detection sensor;

wherein:

the slip sheet detection sensor includes a height sensor configured to measure a height between a surface of the seated destacked layer and a predetermined datum and send height measure data embodying the height measure to the controller, and the slip sheet detection sensor includes a distance sensor configured to measure a distance in which the height sensor registers the height measure and send the controller distance measure data embodying the distance measure, and the controller is configured to merge the height measure data and distance measure data forming a two-dimensional depth map characterizing the at least one of the uppermost surface and the bottom surface of the seated destacked layer.

2. The layer destacking system of claim 1, wherein the controller is configured to measure the distance in the conveyance traverse direction.

3. The layer destacking system of claim 1, wherein the slip sheet pickup removal mechanism is a gantry above the layer seating platform.

4. The layer destacking system of claim 1, wherein the slip sheet pickup removal mechanism has a pick head that engages an upper surface of the slip sheet.

5. The layer destacking system of claim 1, wherein the slip sheet detection sensor is disposed to sense the slip sheet on the at least one of the uppermost surface and the bottom surface of the seated destacked layer.

6. The layer destacking system of claim 1, wherein the slip sheet detection sensor is disposed to sense the slip sheet on the at least one of the uppermost surface and the bottom surface of the seated destacked layer with the destacked layer seated on the conveying surface.

7. The layer destacking system of claim 1, wherein the slip sheet detection sensor is an electromagnetic beam sensor arranged so as to emit a sensing beam in a direction that crosses a seating plane of the conveying surface so as to sense the slip sheet on the at least one of the uppermost surface and the bottom surface of the seated destacked layer.

8. The layer destacking system of claim 1, wherein the slip sheet detection sensor is an imaging sensor registering the slip sheet on the at least one of the uppermost surface and the bottom surface of the seated destacked layer in a direction crossing a seating plane of the seated destacked layer seated on the conveying surface.

9. The layer destacking system of claim 1, further comprising a displacer movably coupled to the layer seating platform and actuable in a direction aligned with the conveyance traverse direction between an advanced position and a retracted position that displaces the seated destacked layer and the slip sheet on the bottom surface relative to each other stripping the seated destacked layer and slip sheet from each other.

10. The layer destacking system of claim 9, wherein the displacer is actuable to raise and lower to and from engaged and disengaged positions.

11. The layer destacking system of claim 9, wherein retraction of the displacer and slip sheet pick up for discharge with the slip sheet pickup removal mechanism are decoupled from each other.

12. The layer destacking system of claim 9, wherein retraction of the displacer and slip sheet pick up for discharge with the slip sheet pickup removal mechanism are substantially coincident, at least in part.

13. A method for destacking a layer from a stacked layer pallet load with a layer destacking system, the method comprising:

providing a layer seating platform for seating the destacked layer on the layer seating platform, and having a conveying surface with a conveyance traverse direction traversing the seated destacked layer off the layer seating platform;

providing a slip sheet detection sensor coupled to the layer seating platform, arranged for sensing a slip sheet in contact with the seated destacked layer on at least one of an uppermost surface and a bottom surface of the seated destacked layer;

providing a slip sheet pickup removal mechanism extending at least in part over the layer seating platform for engaging, above the layer seating platform, the slip sheet contacting the at least one of the uppermost surface and the bottom surface of the seated destacked layer; and receiving, with a controller communicably coupled to the slip sheet detection sensor, a signal from the slip sheet detection sensor identifying presence of the slip sheet, wherein the controller is operably connected to the slip sheet pickup removal mechanism for actuating the slip sheet pickup removal mechanism engaging the slip sheet contacting the at least one of the uppermost surface and the bottom surface, and lifting the slip sheet effecting discharge of the slip sheet off the layer seating platform based on the signal.

14. The method of claim 13, further comprising determining, with the controller, from the signal, the slip sheet contacting the at least one of the uppermost surface and the bottom surface of the seated destacked layer.

15. The method of claim 13, wherein the slip sheet pickup removal mechanism is a gantry above the layer seating platform.

16. The method of claim 13, wherein the slip sheet pickup removal mechanism has a pick head for engaging an upper surface of the slip sheet.

17. The method of claim 13, wherein the slip sheet detection sensor is disposed for sensing the slip sheet on the at least one of the uppermost surface and the bottom surface of the seated destacked layer.

18. The method of claim 13, wherein the slip sheet detection sensor is disposed for sensing the slip sheet on the at least one of the uppermost surface and the bottom surface of the seated destacked layer with the destacked layer seated on the conveying surface.

19. The method of claim 13, wherein the slip sheet detection sensor is an electromagnetic beam sensor arranged for emitting a sensing beam in a direction that crosses a seating plane of the conveying surface for sensing the slip sheet on the at least one of the uppermost surface and the bottom surface of the seated destacked layer.

20. The method of claim 13, wherein the slip sheet detection sensor is an imaging sensor registering the slip sheet on the at least one of the uppermost surface and the bottom surface of the seated destacked layer in a direction crossing a seating plane of the seated destacked layer seated on the conveying surface.

* * * * *